United States Patent [19]
Worsley et al.

[11] Patent Number: 5,594,734
[45] Date of Patent: Jan. 14, 1997

[54] ASYNCHRONOUS PROCESSOR ACCESS TO A SWITCH TABLE IN A NETWORK WITH ISOCHRONOUS CAPABILITY

[75] Inventors: Debra J. Worsley, Vista; Michael T. Werstlein, Sunnyvale; Richard W. Thaik, San Jose, all of Calif.

[73] Assignee: National Semiconductor Corporation, Santa Clara, Calif.

[21] Appl. No.: 146,336

[22] Filed: Nov. 1, 1993

Related U.S. Application Data

[63] Continuation-in-part of Ser. No. 969,916, Nov. 2, 1992, abandoned.

[51] Int. Cl.$^6$ ..................................................... H04L 12/43
[52] U.S. Cl. ........................... 370/395; 370/513; 395/250
[58] Field of Search ............................... 370/66–68, 85.1, 370/85.13, 85.14, 85.15, 110.1, 112, 94.3, 55, 58.1, 60, 94.2, 119; 340/825.52, 58.1; 395/250, 830, 823, 880, 550

[56] References Cited

U.S. PATENT DOCUMENTS

| | | | |
|---|---|---|---|
| 4,220,816 | 9/1980 | Howells et al. | 370/24 |
| 4,258,434 | 3/1981 | Glowinski et al. | 370/60 |
| 4,412,324 | 10/1983 | Glowinsky et al. | 370/58.1 |
| 4,445,213 | 4/1984 | Baugh et al. | 370/94.1 |
| 4,530,088 | 7/1985 | Hamstra et al. | 370/110.1 |
| 4,543,652 | 9/1985 | Amada et al. | 370/66 |
| 4,547,880 | 10/1985 | De Vita et al. | 370/67 |
| 4,549,292 | 10/1985 | Isaman et al. | 370/85.15 |
| 4,577,312 | 3/1986 | Nash | 370/84 |
| 4,587,650 | 5/1986 | Bell | 340/825.05 |
| 4,637,014 | 1/1987 | Bell et al. | 340/825.05 |
| 4,759,010 | 7/1988 | Murata et al. | 370/66 |
| 4,766,590 | 8/1988 | Hamada et al. | 370/56 |
| 4,766,591 | 8/1988 | Huang | 370/60 |
| 4,845,609 | 7/1989 | Lighthart et al. | 364/200 |
| 4,954,988 | 9/1990 | Robb . | |
| 4,959,774 | 9/1990 | Davis | 364/200 |
| 4,961,188 | 10/1990 | Lau | 370/94.2 |
| 4,985,891 | 1/1991 | Fujiwara et al. | 370/110.1 |
| 5,001,707 | 3/1991 | Kositpaiboon et al. | 370/94.1 |
| 5,014,247 | 5/1991 | Albachten, III et al. | 365/230.05 |
| 5,084,872 | 1/1992 | Le Cucq et al. | 370/85.1 |
| 5,146,455 | 9/1992 | Goke et al. | 370/66 |
| 5,163,148 | 11/1992 | Walls | 395/600 |
| 5,283,786 | 2/1994 | Hoff et al. | 379/85.13 |

OTHER PUBLICATIONS

Integrated PBX Systems, An NCC State of the Art Report, The National Computing Centre Limited, 1987.
ISDN Basic Rate Interface System Design Guide, Telenetworks document, Aug., 1989.
ISDN Primary Rate Interface System Design Guide, Telenetworks, document, Jul., 1989.
IEEE 802.3 Draft Supplement to IEEE Std 802.3 CSMA/CD Access Method and Physical Layer Specifications, Institute of Electrical and Electronics, Nov., 1989.

(List continued on next page.)

*Primary Examiner*—Benedict V. Safourek
*Assistant Examiner*—Chau T. Nguyen
*Attorney, Agent, or Firm*—Limbach & Limbach LLP

[57] ABSTRACT

A data communication system, such as a local area network, is provided with a capability of transmitting isochronous data. Preferably the system conveys both isochronous data and non-isochronous data by time-multiplexing the data into a recurring frame structure on a four-bit nibble basis. Switching of data is handled using switching tables. The tables can be updated by a processor. Updates can be performed asynchronously so that the processor does not have to wait until the switch tables are in an unused updatable state before outputting the update information. An efficient encoding scheme permits transmission of both isochronous and non-isochronous data over existing media, such as twisted pair, without degrading bandwidth previously achieved for non-isochronous data over the same media, such as using an Ethernet system. The arriving data is de-multiplexed at the hub into separate channels for handling the separate streams by appropriate hardware.

18 Claims, 19 Drawing Sheets

OTHER PUBLICATIONS

A communication system proposal presented to representatives of Apple Computer on Mar. 5, 1990.

Irube et al., "Integrated Information and Communication System for Business Networks" *Hitachi Review* 40(3):241–247 (1991).

HMUX ERS "FDDI–II Hybrid Multiplexor (HMUX)" Rev. 2.4, (Mar. 25, 1991).

On or about Nov. 1, 1991, IBM Corporation provided a "Task Order" and appendix. A copy of pp. 6 and 7 of the Task Order and appendix titled, Isoethernet Project Local Cluster Controller Version 1.2.

"Exchangeable Card Architecture Specification," Release 1.00, bearing the date Dec. 20, 1991, pp. 7, 20 and 22.

"PCMCIA Socket Services Interface Specification," Draft 2.00b, bearing the date Jul. 17, 1992.

"VersaNet™ An Ethernet Extension for Isochronous Communications" bearing the date Aug. 14, 1992 is a paper sent to National Semiconductor Corporation from Condor Systems, Inc. of San Jose, California on Aug. 18, 1992.

"IBM's Multimedia Venture: Opportunity for its Hardware?", vol. 38, No. 1930, p. 1, Sep. 21, 1992.

"DP839XX Isochronous Time Slot Exchanger (IsoTSX™)", Revision 0.8, bearing the date Oct. 29, 1992 and DP839XX Isochronous Ethernet Physical Layer isoPHY™ Revision 1.1, bearing the date Oct., 1992, were disclosed to International Business Machines.

A disclosure of a communication system was presented at the IEEE 802.9, Standards Meeting on Nov. 8–12, 1992. The pages entitled "Multi–Media Applications are Ready".

"National Proposes Isochronous Ethernet", *Electronic News*, vol. 38, No. 1940, p. 19, Nov. 30, 1992.

IEEE 802.9, Draft Standard Integrated Services (IS) LAN Interface at the MAC and PHY Layers, Institute of Electrical and Electronics, Nov., 1992.

"DP839XX Isochronous Ethernet Physical Layer Iso-PHY™," Revision 2.1, bearing the date Dec., 1992 and DP839XX Isochronous Time Slot Exchanger (isoTSX), Revision 1.0, bearing the date Dec. 13, 1992, were disclosed to IBM and Ericsson.

"DP839XX Isochronous Ethernet Physical Layer iso-PHY™" Revision 3.0, bearing the date Dec., 1992 and Isochronous Time Slot Exchanger (IsoTSX™) Workbook, Revision 1.2, bearing the date Feb. 16, 1993 was disclosed to Luxcom, Inc. of Fremont, California.

DP8390 Network Interface Controller: An Introductory Guide, Local Area Network Databook, National Semiconductor Corporation, pp. 1–206 to 1–213, 1992 Edition.

DP83932B Systems–Oriented Network Interface Controller, Local Area Network Databook, National Semiconductor Corporation, pp. 1–288 to 1–383, 1992 Edition.

DP83950EB Repeater Interface Controller, Local Area Network Databook, National Semiconductor Corporation, pp. 3–3 to 3–73, 1992 Edition.

DP83950EB at IEEE 802.3, Multi–Port Repeater Evaluation Kit, Local Area Network Databook, National Semiconductor Corporation, pp. 75–87, 1992 Edition.

American National Standard for Information System —document X3.139–1987.

"Scheme for Fast Ethernet Proposed," by Loring Wirbel, appears to be a newspaper article. At present, the date of this article is unknown, but it is currently believed to be prior to Mar., 1993.

"Local Area Network Databook" published by National Semiconductor, pp. 1–3 to 1–9, 1–242 to 1–248, 5–3 to 5–7.

"Token–Ring Network Architecture Reference," pp. 5–1 through 5–28 and pp. 5–10 and 5–17.

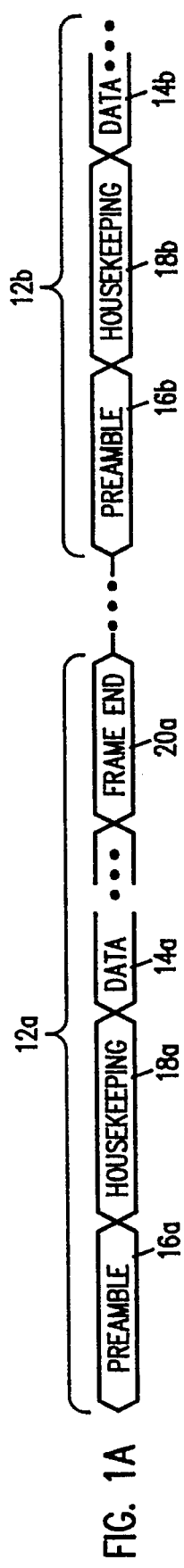
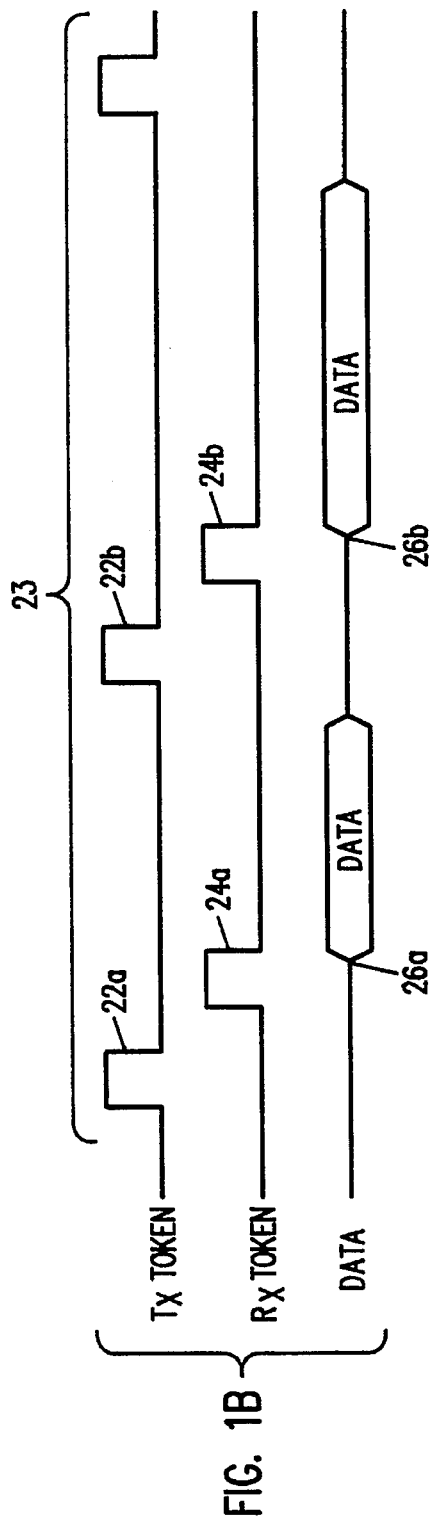
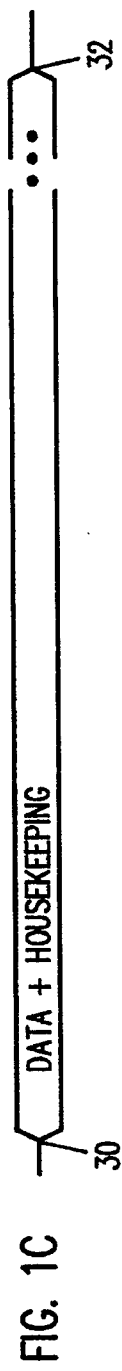
FIG. 1A
FIG. 1B
FIG. 1C

ASYNCHRONOUS PROCESSOR ACCESS TO A SWITCH TABLE IN A NETWORK WITH ISOCHRONOUS CAPABILITY

This is a continuation-in-part of Ser. No. 07/969,916, filed Nov. 2, 1992, abandoned, for "Network for Data Communication with Isochronous Capability," incorporated herein by reference.

The present invention relates to communication between stations in a data communication system, such as a local area network or wide area network, and in particular to a network for transferring isochronous data via an asynchronous access by a processor to a local switch table.

BACKGROUND OF THE INVENTION

In general terms, isochronous data is data which is non-packetized and of indeterminate, potentially continuous duration. Increasing availability of multi-media computers and work stations has contributed to an increase in interest in the transfer of data from isochronous data sources and sinks. An isochronous data source is a device which outputs data in a continuous stream, usually at a substantially constant average data rate. Examples include video cameras, which output a substantially continuous stream of data representing images and associated sounds, and telephone output, which can be a substantially continuous output of voice data (either analog or digitized). An example of an isochronous data sink is a video monitor which can receive a substantially continuous stream of video data for display.

Related to isochronous sources and sinks is the concept of data transfer which can also be either isochronous or non-isochronous. One type of non-isochronous data transfer is a packet-type transfer. As shown in FIG. 1A, data can be transferred in a plurality of packets 12a, 12b which can be either constant-sized or variable-sized. Each packet includes a field of data 14a, 14b which may be preceded and/or followed by non-data information such as preamble information 16a, 16b housekeeping information such as data source information, data destination information, and the like 18a, 18b and a frame end marker 20a. As seen in FIG. 1A, because the fields provided for data 14a, 14b are not substantially continuous, the packetized scheme of FIG. 1A is not isochronous but "bursty" in nature. An example of packetized data transfer is the commonly-used Ethernet system. Standard Ethernet systems are described in IEEE Standard 802.3. One implementation of which, known as 10 Base T, is described in the draft nine supplement to IEEE standard 802.3, dated Nov. 15, 1989.

Another type of non-isochronous data transfer is a token ring system. In a token ring system, a node is permitted to transmit data only after receipt of an electronic "token." As depicted in FIG. 1B, a first station may transmit a token 22a which is received 24a by a second station whereupon the second station may begin transmission of data 26a. After a period of data transmission, the second station transmits the token 22b which is received by a third station 24b that can then begin its own transmission of data 26b. As seen in FIG. 1B, because data transmission is synchronized with the occurrence of an event (the arrival of a token), the token ring system is not an isochronous data transfer system. One commonly used token ring Network is described in IEEE standard 802.5.

In contrast, FIG. 1C schematically depicts isochronous data transfer. In isochronous data transfer, the data transfer or connection is initiated, such as by initiating a telephone conversation or beginning a video camera transmission 30. After the connection is initiated, transmission of the data, possibly accompanied by transmission of housekeeping information (such as destinations, audio or video timing, and the like) is provided substantially continuously for an indeterminate period, such as until termination of the connection 32. Although it may be that not every bit transferred represents a data bit (since "housekeeping" bits may be also transferred), the transfer of data is substantially continuous in the sense that there are no substantial periods during which no data bits are transferred. It is possible that the data being transferred is "Null" data such as silence during a telephone conversation or transfer of a blank video image. One type of isochronous data transfer is the Fiber Distributed Data Interface-II (FDDI-II) as described, for example, in *FDDI-II Hybrid Multiplexer*, Revision 2.4, dated Mar. 25, 1991.

Previous attempts to accommodate isochronous data on a data network have resulted in characteristics which are disadvantageous for at least some applications. In some previous isochronous devices, the bandwidth available for accommodating a given isochronous source or sink was at least partially dependent on the demand on the network (i.e. on the total amount of data from and to sources and sinks transmitting and receiving on the network). In this type of system, performance of an isochronous source or sink could perceptibly degrade as additional sources or sinks were added to the network, such as by increasing data transfer delay. Preferably, both isochronous and non-isochronous bandwidth is provided, with the isochronous bandwidth being fixed and insensitive to non-isochronous demand and the non-isochronous bandwidth being fixed and insensitive to isochronous demand.

In some network devices, a processor, such as a microprocessor, is provided for controlling operations, including controlling the switching of data (e.g., isochronous data) and data packets (non-isochronous) to and from sinks and sources in the network. In some devices, one or more updatable tables are provided in connection with such switching or routing of data or data packets. However, in those types of networks in which the switching of data is not necessarily synchronous with the processor, efficiency of the system has suffered when either of the processor or the switching system must wait for an output or a completion of operation by the other.

Accordingly, it would be advantageous to provide a system in which the processor can update a local switch table in an asynchronous fashion, so as to substantially reduce or eliminate the need for the processor or the switching system to wait for an output or completion of operation by the other.

Many types of isochronous data transfer systems fail to provide for inter-operability with data derived from non-isochronous sources or sinks. In this type of system a given link is unable to transfer data from both an isochronous source/sink and a non-isochronous source/sink in a concurrent fashion (i.e. both within a time frame sufficiently short that the transfer is effectively simultaneous such that the ability of data sinks to process the data and the user's perception of the data are not substantially impacted). In these systems, it is infeasible to provide a single node which is coupled to both isochronous and non-isochronous source/sinks (such as a multi-media PC having Ethernet capabilities and a video camera).

Some previous isochronous systems provide little or no compatibility with previous networks so that extensive replacement of hardware or software becomes necessary. For example, in some schemes, it is necessary to replace the physical medium such as twisted pair media, or if existing in-place physical media are used, the performance is degraded, such as by a decrease in bandwidth for the type of communication formerly carried by the existing media.

Some isochronous systems require installation of new Media Access Controllers (MAC) or provision of new application software (such as local area network software). Some previous isochronous systems introduce an undesirable degree of delay or "jitter" (data discontinuities). Some types of isochronous systems are inflexible in the amount of bandwidth provided for isochronous data such that if the data rate of an isochronous source or sink is not precisely matched to the available bandwidth, the bandwidth will be either overwhelmed or substantially under-utilized by the isochronous traffic.

It would further be advantageous to provide an isochronous data communication system in which there is no inherent decrease in non-isochronous bandwidth as a result of increasing isochronous traffic and vice versa. It would be further advantageous to provide an isochronous system which is interoperable with non-isochronous sources or sinks particularly in such a way that the presence of the isochronous system is transparent to previously installed media access controllers and application software, and is preferably interoperable with either or both of an Ethernet system and a token ring system. Preferably, inter-operability with other systems such as FDDI-II, Asynchronous Transfer Mode (ATM) and/or Synchronous Optical Network (SONET) can also be provided. It would be also advantageous to provide an isochronous system which can use existing physical media, such as twisted pair media, and particularly without decreasing the effective bandwidth available with non-isochronous traffic. Preferably the isochronous system would be substantially backwards-compatible for example with an existing Ethernet system so that existing nodes, e.g. non-isochronous nodes, could operate on the isochronous network and could later be upgraded to take advantage of isochronous capability, as desired.

SUMMARY OF THE INVENTION

In one embodiment of the present invention, a processor is able to write one or more updates into a switch table and/or routing table in a fashion which is asynchronous with the operation of the switching device. In one embodiment, the processor is permitted to write updates to a register, preferably to a single register address in the switch device. The information written into the register is then used to perform the updates to the switch table. Specifically, updates are held temporarily in a holding register until such time as the switch table may be written. In some configurations (e.g., when a single port RAM is used for the table), the switch tables are in use for normal operation a majority of the time and no updates to the switch tables are made during such time. When the updates are allowed to take place, the contents of the holding registers are read out into the switch table, preferably in the order they were written in. A holding register allows the external processor to burst data for switch table updating, freeing it to perform other tasks. Preferably, the data the processor writes to the switch table contains both control words (indicating, e.g., a location in the switch table) and data. In one embodiment, a single control word is provided for a plurality of data words which are successively stored in locations incremented a predetermined amount with respect to the data location of the first data word.

An isochronous switching device may have data flowing in two directions referred to as the receive direction and transmit direction. In one embodiment, to facilitate loading and efficiency of switching control information into the switch table, the switching control information is stored in two independent switch tables, one receive and the other transmit. The receive switch table controls the receive direction and the transmit switch table controls the transmit direction.

Preferably, the processor need not keep track of the transfer from the holding registers to the switch tables and preferably the processor receives information (either by interruption or polling) to indicate that all the updates have been performed and it is permissible to send more update data. In this way, the processor is not required to wait for appropriate times before outputting switch table update information and preferably is not required to keep track of the status of the transfer from the holding registers to the switch tables. In this way, the need for the processor (or the switching device) to wait is reduced or eliminated and, preferably, the processing load on the processor is reduced or minimized.

Communication of data to and from isochronous data sources and sinks is provided such that the bandwidth available to an isochronous source/sink is independent of changes in isochronous demand on the network. Of the total bandwidth used for communication over the network links or physical media, at least a portion of the total bandwidth is dedicated to isochronous traffic. Preferably the bandwidth available for isochronous traffic can be selected or allocated with a predetermined granularity, e.g. so that the quality of transmission service desired for a given isochronous source or sink can be selected and the selected bandwidth can be sustained throughout the isochronous communication or connection. Preferably, a portion of bandwidth on the link is also dedicated to convey data to and from non-isochronous sources and sinks, as well as to permit conveying housekeeping information (such as information relating to data sources and destinations) and status and control maintenance information.

In one embodiment, the isochronous communication system can be provided while maintaining a high degree of compatibility with previous, often in-place, systems, thus requiring only minimal replacement of hardware/software. For example, the described system can be provided so that it is transparent to previously-available Media Access Controllers (MACs) such as Ethernet MACs and token ring MACs. In this embodiment, a system of buffering can be provided to convert between the packetized or token ring non-isochronous data which is output from or input to the MAC, and the isochronous data stream.

Several features contribute to the ability to use previously available media such as twisted pair physical media without degrading data rates achieved previously on the media, such as data rates achieved on previous Ethernet or token ring networks. In one embodiment, functionality of previously available physical media is preserved by using an efficient coding scheme permitting a given amount of bandwidth to convey both isochronous traffic and previous types of non-isochronous data traffic such as Ethernet or token ring-type traffic.

In one embodiment, data from an isochronous data source is time-division multiplexed with the data output from a non-isochronous source such as the data output from the media access controller from a previously available non-isochronous network node. These two data streams are preferably also multiplexed with maintenance data (sometimes referred to as "M channel") and "D channel" data. In one embodiment, the D channel bandwidth is provided as a service to the user without placing restraints of what types of signals can be transmitted on the D channel. It is anticipated that the D channel will commonly be used for conveying connection control information such as source and destination information or information such as bandwidth or status information, but it could also be used to convey, e.g., packetized data. In the depicted embodiment, the various types of data are time-division-multiplexed in a repeating frame structure or template. The template is constructed to satisfy the data rate requirements of the various data sources and sinks. The data streams are encoded for transmission using an efficient coding scheme which permits non-isochronous data to be transmitted at a rate not substantially smaller than, and preferably substantially equal to the data rate at which the non-isochronous data was transmitted according to previously available network systems. In one embodiment a four/five encoding scheme is used. The four/five encoding scheme provides for a number of non-data symbols. In one embodiment, the extra data symbols can be used in emulating aspects of the non-isochronous data sources and sinks to permit transmission of non-isochronous-sourced data embedded in an isochronous data transfer system.

Preferably, the present system is implemented as a star-topology network with data sources transmitting to a central hub which, in turn, transmits the data to data sinks. Although, for convenience, much of the following discussion is in terms of hubs and nodes, aspects of the present invention can be implemented in topologies other than hub-and-node topologies (e.g., ring topologies and tree topologies), as will be apparent to those of skill in the art. Descriptions of hub circuitry in the following can be implemented, e.g., on a PBX adapter card for a personal computer. Several star-topology systems can be connected by providing inter-connection of the hubs, for example, in a ring structure (FIG. 3A). The system could also be arranged in a tree structure where one hub 44d is connected to others (44e, 44f) as depicted, e.g., in FIG. 3B. The multiplexed data from the node which arrives at the hub is de-multiplexed to separate the isochronous-source data, the non-isochronous-source data and the D channel and M channel information. The non-isochronous-source data can be provided to hub circuitry specialized for handling the non-isochronous data stream. Preferably, circuitry in the hub will convert the separated non-isochronous data stream into a form substantially similar to the form the data stream would have after arrival over a previously available non-isochronous network. For example, where non-isochronous data is sourced from an Ethernet MAC, the hub will convert the separated non-isochronous data to a form such that it can be properly handled by standard Ethernet hub repeater circuitry.

The separated isochronous data is conveyed to locations where it can be transmitted to the destination nodes of the network. In one embodiment, the separated isochronous data is placed on a high bandwidth hub bus, with bandwidth capable of transmitting the collective isochronous data streams arriving from all nodes connected to the hub. The data arriving from the nodes can be placed onto the high bandwidth bus by e.g. a time slot interchange (TSI) function. One type of time slot interchange is described in *FDDI-II Hybrid Multiplexer*, Revision 2.4, dated Mar. 25, 1991. Preferably, the isochronous data is placed onto the high bandwidth bus and retrieved from the high bandwidth bus (for transmission back to the destination nodes) according to switching tables programmed in accordance with source/destination data transmitted over the D channel. In this way, the hub has sufficient intelligence to set up and maintain isochronous communication sessions or connections which may be requested on the D channel.

The hub contains multiplexers for combining both isochronous-sourced data such as that retrieved from the high bandwidth bus, and non-isochronous-sourced data e.g. from Ethernet hub repeater circuitry. These data sources, along with M channel and D channel information, are multiplexed in a fashion similar to the multiplexing which occurred at the nodes and the multiplexed data is transmitted back to the nodes, preferably over a separate set of one-way twisted pair media. The nodes contain demultiplexers, similar to those found in the hub, for separating the isochronous-sourced data, non-isochronous-sourced data, D channel and M channel information streams. The separated non-isochronous data is preferably converted to a form compatible with previously available media access controllers, such as the media access controllers which sourced the non-isochronous data. The isochronous data may be provided to isochronous data sinks connected to the node.

To provide for high quality of service, it is desirable to reduce the delay or jitter of the transmitted data. In one embodiment, the amount of buffering is selected to minimize or reduce delay and jitter.

The frame structure used for transmission over the media provides a data rate which, while substantially constant over a long time frame, is variable over a short time frame (such as less than one template) and buffering can be used for smoothing the variable data rate to provide compatibility with, e.g. previously available MACs.

The time slot interchange (TSI) function can also be implemented by making use of a set of data buffers. By careful control of the timing of the system, it is possible to provide only two buffers for the TSI function at each end of each one-way link. Preferably, in a first data transfer direction, a first buffer finishes exchanging data onto the TSI bus by the time a second buffer has finished receiving data from one or more nodes such that the two buffers can change roles. In a second, opposite direction, a first buffer finishes receiving data from the TSI bus by the time a second buffer has finished exchanging data to the nodes. In this way, only two buffers are necessary for the time slot interchange function at each end of a one-way medium. Careful control of the system timing provides a tightly-coupled system in which data which is arriving during the period of a first frame transmission can be transmitted to the next stage of the system at the next frame period, i.e. without waiting one or more intervening frame periods. Such tight coupling reduces the overall delay of the system. Consistency of timing reduces jitter.

According to one embodiment, the invention includes, in a computer-controlled system having a microprocessor operating according to a first clock and an updatable table operating asynchronously with said first clock, apparatus for updating said updatable table, comprising register means for receiving update data from said microprocessor during a first time period asynchronously with the operation of said updatable table; means for determining the beginning of a first period of time during which said updatable table is not being used and for updating said updatable table during said first period, asynchronously with said first clock, using at least some of said update data, wherein said computer controlled system includes an updatable transmit table and updatable receive table, and wherein said register means includes at least a transmit holding register for holding data for updating said updatable transmit table, a receiving holding register, different from said transmit holding register, for holding data for updating data for updating said updatable receive table.

According to one embodiment, the invention includes apparatus for communicating at least first and second stations in a data communications system over at least a first link, said data communication system including a plurality of data sources and sinks, at least a first of said sources and sinks configured to receive or transmit data isochronously and a second of said sources and sinks configured to transmit data non-isochronously, the apparatus comprising at least a first receiver and at least a first transmitter in said first station; said first link coupling said first station with said second station; said second station being coupled to both said first and said second of said sources and sinks; a second transmitter in said second station for transmitting data to said first receiver; a first multiplexer in said second station for permitting the transmitting of data from both of said first and second sources and sinks over said first link as first multiplexed data, said multiplexer providing a first, dedicated bandwidth for first data originating from an isochronous source, including at least said first of said sources and sinks; at least a first updatable switchtable for storing information indicating at least the destination of data; a microprocessor operating according to a first clock, coupled to said updatable switchtable, said updatable switchtable operating according to a second clock, asynchronously with said first clocks; a register for receiving update data from said microprocessor during a first time period asynchronously with the operation of said updatable table in the absence of performing an asynchronous reset.

BRIEF DESCRIPTION OF THE DRAWINGS

FIGS. 1A, 1B and 1C are depictions of the timing of a packet transmission system, a token ring transmission system, and an isochronous transmission system respectively.

DETAILED DESCRIPTION OF THE PREFERRED EMBODIMENT

Before describing the asynchronous process access, a general description of a network, in which the asynchronous process access can be used, will be given.

Figure 2:
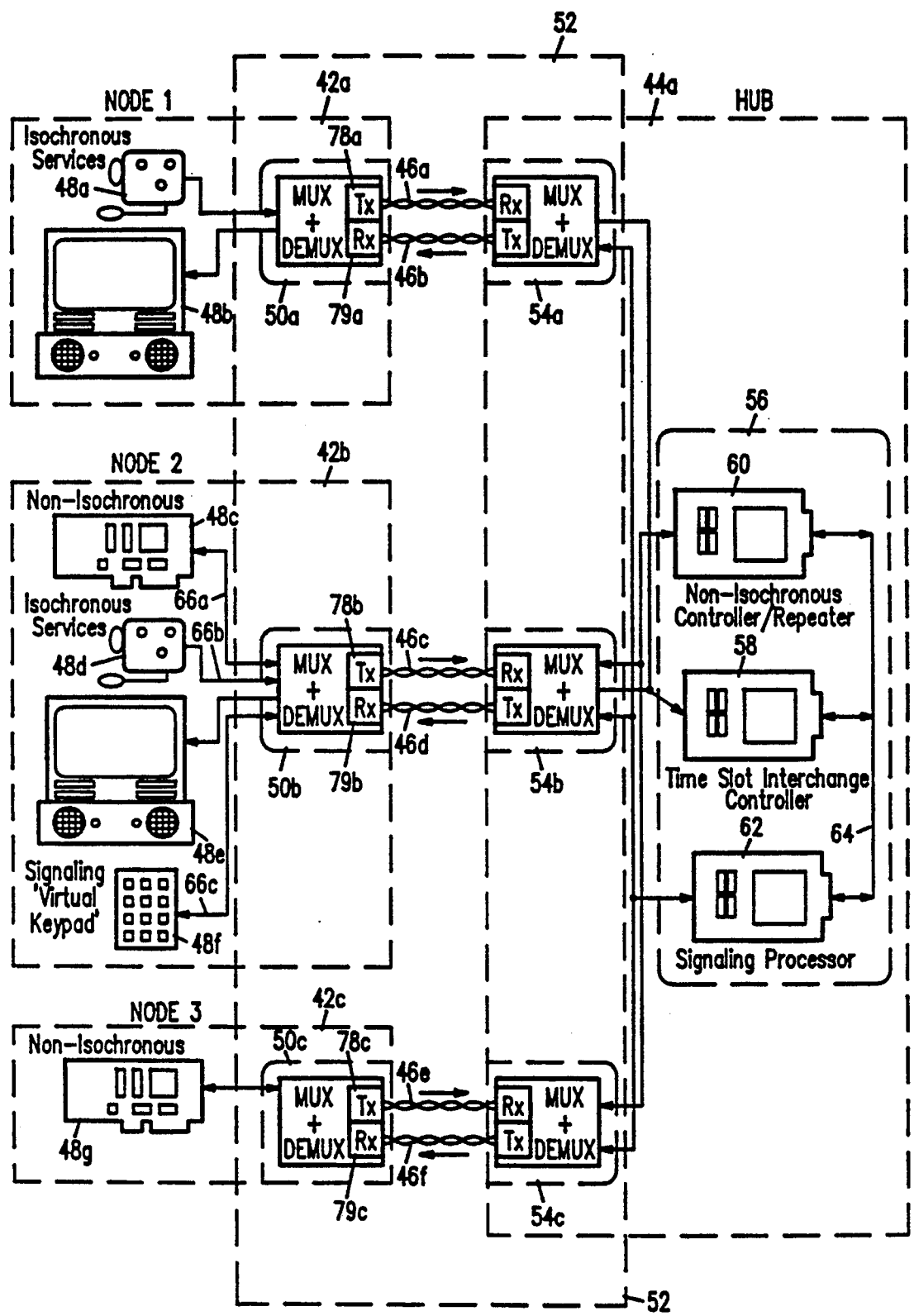
FIG. 2 is a schematic block diagram showing three nodes connecting to a hub according to one embodiment of the present invention.

As depicted in FIG. 2, a data communication system for isochronous data can be configured in a star-topology with a plurality of nodes 42a, 42b, 42c, each coupled to a hub 44a by data links comprising physical data transmission media such as one-way twisted pair wires 46a–46f. The number of nodes can be adjusted depending on the data transmission needs and objectives of the system. In one embodiment, each hub is configured to accommodate connection with up to 16 nodes. Each node 42a, 42b, 42c includes circuitry 50a, 50b, 50c for receiving data, converting it to a form suitable for transmission onto the physical media 46a, 46c, 46e using transmitters 78a, 78b, 78c and receipt of signals from the physical media 46b, 46d, 46f using receivers 79a, 79b, 79c and conversion to a form suitable for use by the data sinks. Each of the nodes 42a, 42b, 42c includes data sources and sinks 48a–48g. The data sources and sinks can be isochronous sources and sinks such as video cameras 48a, 48d and monitors 48b, 48e, non-isochronous sources and sinks such as an Ethernet media access controller 48c, 48g, and signaling or D channel sources and sinks such as an emulated or virtual key pad 48f provided, for example, on a personal computer (PC) terminal.

Each of the nodes 42a, 42b, 42c can include various types of sources and sinks such as strictly isochronous sources and sinks, such as depicted for node one 42a, strictly non-isochronous sources/sinks as depicted for node three 42c or both isochronous and non-isochronous sources and sinks as depicted for node two 42b. In one embodiment, the network is able to operate properly even when connected to one or more nodes which are incapable of communicating using the time-division-multiplexed frame structure described below. For example, the hub 44a could be connected to one or more nodes which contain only previously-available circuitry such as 10 Base T. In this embodiment, the hub is able to detect whether a particular node is capable of time-division-multiplexed frame structure communication as described below. If the node does not have this capability, the hub will fall back to, e.g., a 10 Base T compliant communication mode. In this way, a network can operate in a mixed environment, having some nodes which operate using the time-division-multiplexed frame structure described below and other nodes which operate according to previous protocols. This system of automatic detection and fall back to a compliant communication mode is described in greater detail in commonly-assigned application Ser. No. 07/971,018 (Attorney Docket No. 8332-319/NS-2026), titled "NETWORK LINK ENDPOINT CAPABILITY DETECTION" filed on Nov. 2, 1992, and incorporated herein by reference.

In general terms, and in general accord with the International Standards Organization (ISO) network reference mode, the physical layer of the network is the circuitry between the media access controllers and the media (in the nodes) and between the repeater circuitry (if any) and the media (in any hubs). The physical layer 52 of the network system depicted in FIG. 2 has portions which include the physical media 46a–46f and physical layer devices such as the node data receivers and converters 50a, 50b, 50c and the hub components 54a, 54b, and 54c. The physical layer can include devices for providing, e.g., transceivers for 10 Base T cables, data multiplexing, phase locked loop circuitry, FIFOs or other circuitry for cable length adjustment, smoothing, squelch and the like.

Figure 3A:
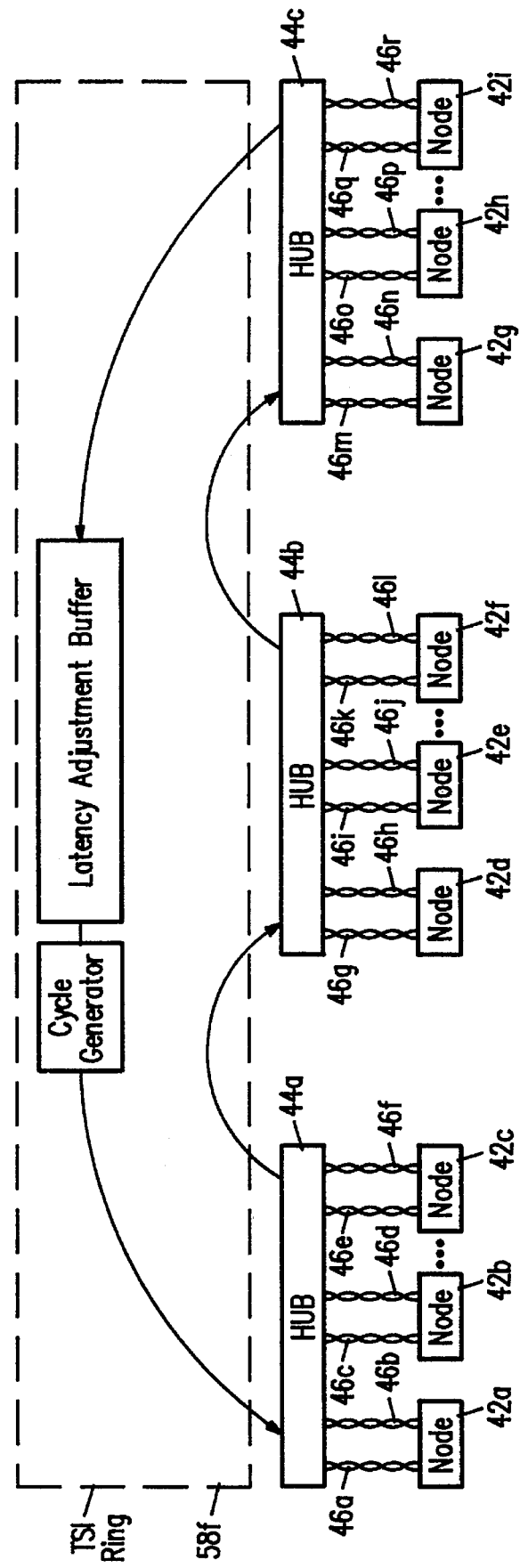
FIG. 3A is a schematic block diagram showing a number of hubs connected together using a ring structure.
Figure 3B:
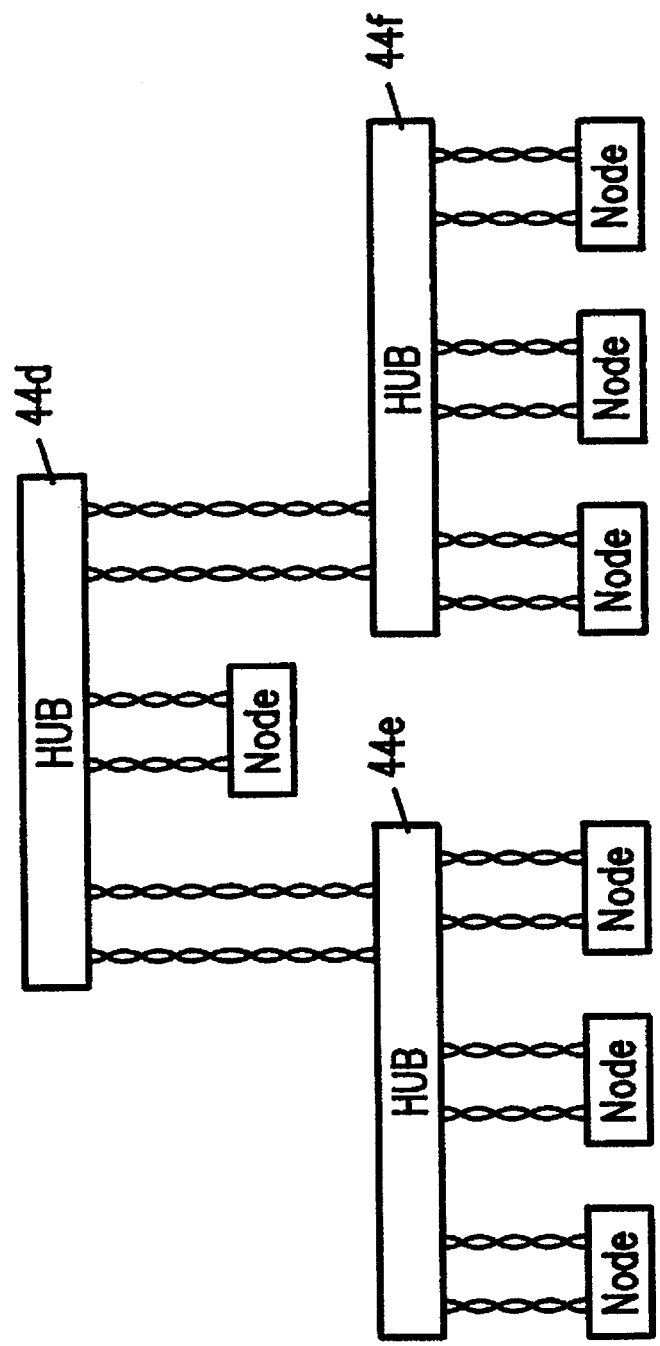
FIG. 3B is a block diagram showing a number of hubs connected together using a tree structure.

The hub 44a includes circuitry 54a, 54b, 54c for receiving data from the physical media 46a, 46c, 46e separating the isochronous-sourced data from the non-isochronous-sourced data and the D channel and M channel data and converting separated data into a form suitable for handling by downstream hub circuitry 56. In the depicted embodiment the separated isochronous-sourced data is provided to a time slot interchange controller 58 for placing the data on a high-bandwidth bus so that it can be transported to destination nodes, e.g., on other TSI controllers in the same hub or in other hubs (as depicted in FIGS. 3A and 3B) or locally looped back to one of its attached nodes and retrieved by hub circuitry 54a, 54b, 54c for transmission to one or more of the various destination nodes 42a, 42b, 42c. The separated non-isochronous data is provided to circuitry 60 configured to convey the non-isochronous data to one or more of the hub circuitry 54a, 54b, 54c for transmission to destination nodes 42a, 42b, 42c. In an embodiment in which non-isochronous-sourced data includes Ethernet data, the hub circuitry 60 can be a standard Ethernet repeater processor. In this way, the network can be at least partially backwards-compatible with previous Ethernet hub systems. The D channel and M channel information is provided to a processor 62 which performs various maintenance and control functions such as identifying and alerting users of error conditions, and setting up requested connections, i.e. source/destination paths e.g. by communicating with the isochronous and non-isochronous controllers 58, 60, e.g. over data path 64. The isochronous controller 58 can be a data exchanger, e.g., an isochronous switching device, such as that described in commonly-assigned application Ser. No. 08/146,337 (attorney docket no. 8332-331), titled "Time Slot Exchanger Switching Mechanism in a Network for Data Communication Having Isochronous Capability," filed on even date herewith and incorporated herein by reference. The non-isochronous controller 60 can be, e.g., an Ethernet repeater.

A number of star-topology systems can be interconnected e.g., by connecting hubs 44a, 44b, 44c to one another in a ring structure as depicted in FIG. 3A wherein each of these hubs have nodes attached in a star topology or by connecting hubs 44d, 44e, 44f in a tree structure as depicted in FIG. 3B wherein 44d has 44e and 44f connected to it in the star topology. In the configuration depicted in FIG. 3A, the hubs 44a, 44b, and 44c are connected in a ring-topology with first hub 44a sending data to the second hub 44b, the second hub 44b sending data to the third hub 44c, the third hub sending data back to the first hub 44a via a ring latency adjustment and cycle generator circuitry. Preferably the data is sent in the same form as output onto the high bandwidth hub bus by the time slot interchange controller 58 and thus the inter-hub connections are referred to as a Time Slot Interchange (TSI) ring. In one embodiment, an FDDI-II system can be used as a backbone to carry the TSI ring data to other hubs as illustrated by 58f in FIG. 3A.

A description of the operation and sub-components of the depicted network will be provided by describing the transfer of data from isochronous source 48d and non-isochronous source 48c to isochronous sink 48b and non-isochronous sink 48g.

Data sent from isochronous device 48d is a continuous stream of digitized data from e.g. a video camera. In the present example, the data from isochronous device 48d will be taken as having a data rate equal to the American "T1" standard of 1.544 Mbps. Data output from the Ethernet MAC 48c is provided at the standard 10 Base T Ethernet rate of 10 Mb/sec. D channel information is provided from a D channel data stream source, preferably contained in a MAC or other circuitry in the system, or, for example, from the virtual key pad 48f at a variable data rate, such as a rate not exceeding about 64 Kbps. These incoming data streams are provided over lines 66a, 66b, 66c to node circuitry 50b' (FIG. 4) which is part of the node data receiver and converter 50b (FIG. 2). The incoming data from the various sources is provided to a multiplexer 70 which performs time-division multiplexing on a four-bit basis. The pattern for the time-division multiplexing is a repeating series of frames or templates. In this embodiment, the frames are repeated every 125 microseconds.

Table IA depicts the manner in which the various data streams, and additional data and control bytes are time-division multiplexed. Each symbol in Table IA represents four bits of data so that every group of two symbols represents one 8-bit byte of data. In Table IA, E represents four bits of data from the non-isochronous Ethernet stream 66a, B designates four bits of data from the isochronous stream 66b, D represents four bits of data from the signaling or D channel stream 66c, and M represents four bits of M channel data which 66d preferably is provided by circuitry 50b. In addition, certain byte-length patterns are provided. JK represents a frame synchronization pattern and EM (the first two bytes of block three in Table IA) represents an Ethernet "pad" followed by a maintenance nibble as described below. As seen in Table IA, each frame contains 256 bytes which can be considered in thirty-two groups of eight bytes each, or four blocks of sixty-four bytes each. The frame structure is described more thoroughly in commonly-assigned application Ser. No. 07/969,911, (Attorney File No. 8332-315/NS-2024), titled "NETWORK FOR TRANSMITTING ISOCHRONOUS-SOURCE DATA WITH A FRAME STRUCTURE" filed on Nov. 2, 1992, and incorporated herein by reference.

Another frame format that can be used in connection with the present invention is shown in Table IB. The frame template of Table IB shows a frame for all-isochronous communication (as opposed to mixed isochronous-Ethernet communication of Table IA). In general, Table IB is similar to Table IA, with replacement of all "E" symbols with "B" symbols. As seen in Table IB, the last one or two bytes in each block are "Idle" data bytes.

Figure 4:
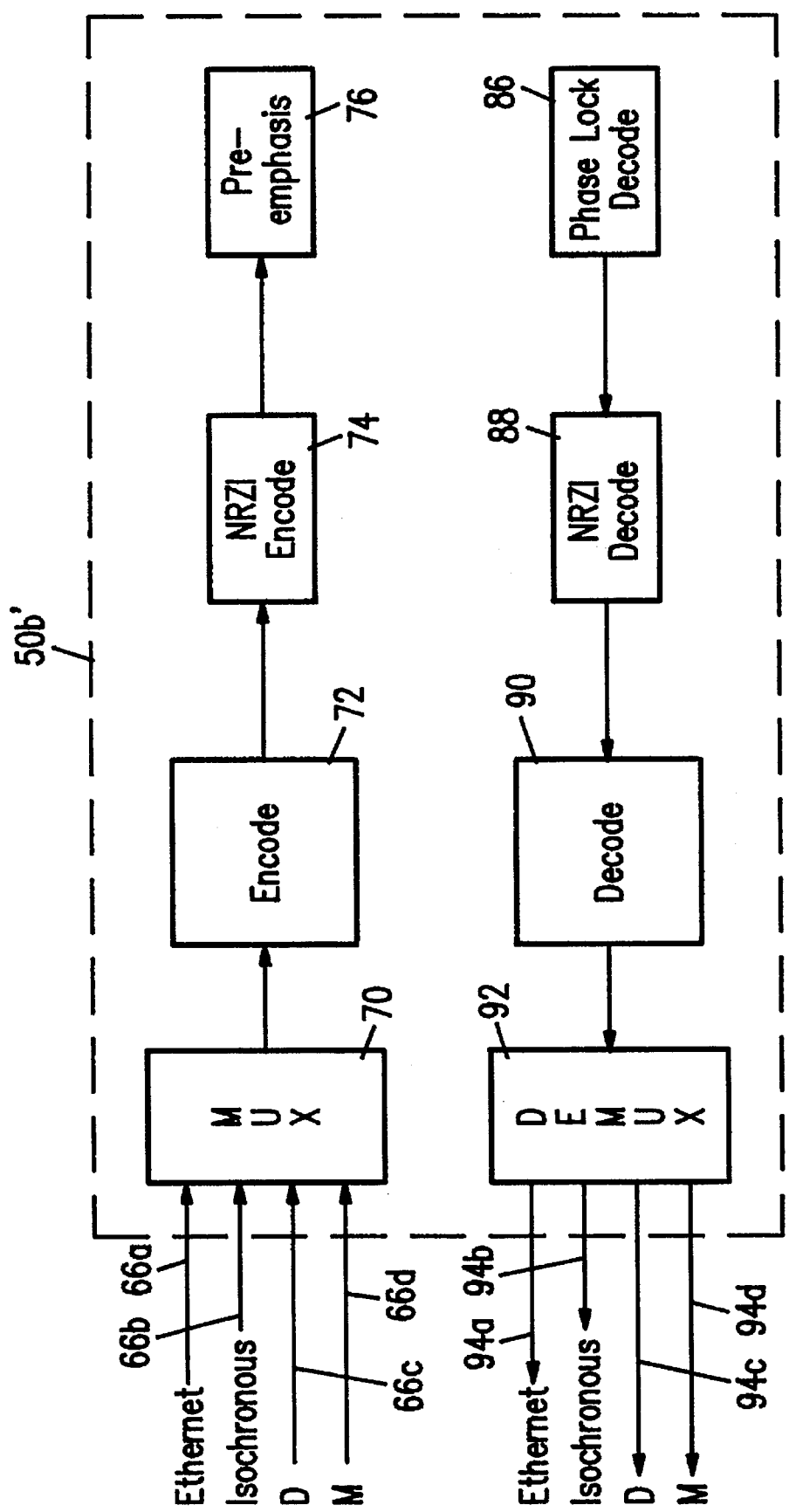
FIG. 4 is a schematic block diagram of circuitry for multiplexing and preparing data for transmission over the media and for receiving information from the media and demultiplexing the data.
Figure 5:
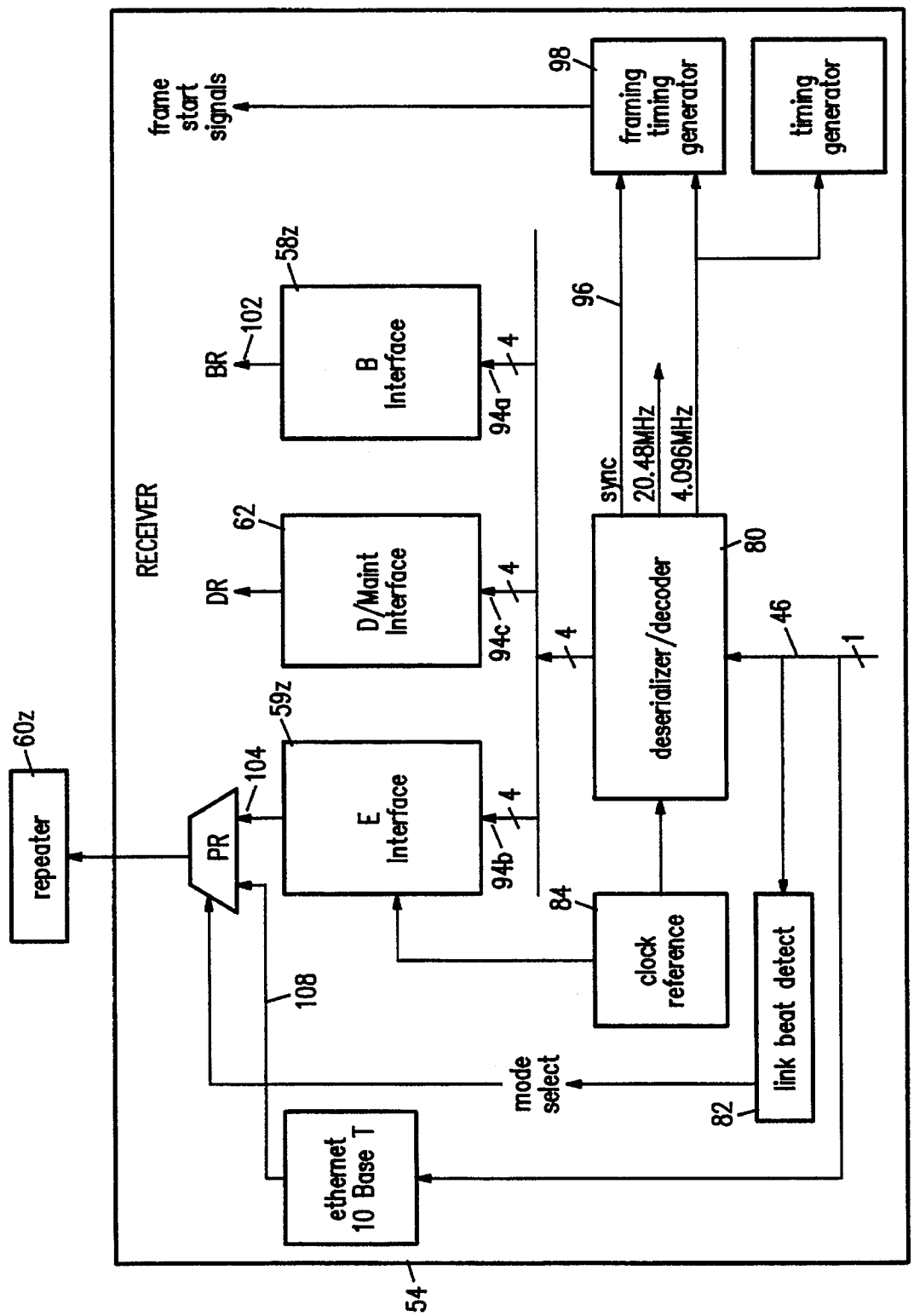
FIG. 5 is a schematic block diagram of receiver circuitry according to an embodiment of the present invention.

The data sent over the physical media 46a is received in the hub 44a. The hub contains a plurality of circuit devices 54a, 54b, 54c, each one coupled to one of the nodes 42a, 42b, 42c by the physical layer/physical layer interface. As depicted in FIG. 5, the data transmitted over the physical layer/physical layer interface arrives serially at a deserializer/decoder 80. Link detect circuitry 82 also receives the data from the physical layer/physical layer interface for detection of the mode in which the node is operating (e.g. 10 Base T, isochronous-Ethernet or isochronous) and outputting a mode select signal, as described more fully in commonly-assigned application Ser. No. 07/971,018, (Attorney File No. 8332-319/NS-2026, titled "NETWORK LINK ENDPOINT CAPABILITY DETECTION," filed on Nov. 2, 1992. The deserializer/decoder 80 receives a reference clock signal 84. The de-serializer/decoder includes circuitry which is functionally an inverse of the multiplexing/encoding circuitry described above. Referring to FIG. 4, the deserializer/decoder includes phase lock decode circuitry 86, the results of which are provided to NRZI decode circuitry 88 which, in turn, provides the decode results to four/five decode circuitry 90, in turn providing results to a de-multiplexer 92 which separates the received data into the isochronous-sourced data 94a the non-isochronous-sourced data 94b and signaling data, such as D channel 94c and M channel data 94d. The deserializer/decoder 80 also outputs a synchronization signal, derived from the JK frame synchronization symbols 96 for use by a framing timing generator 98.

Both the non-isochronous-sourced data 104 (FIG. 5) and the isochronous-sourced data 102 are made available to the hub circuitry 56 or components 54a, 54b, 54c (FIG. 2), as needed for transmission back to destination nodes. In one embodiment, the separated isochronous data 102 and non-isochronous data 104 are reconfigured by the respective interfaces 58, 60 to provide isochronous output 102 and non-isochronous output 104 in a form suitable for processing so as to provide the data as needed for transmission to the destination nodes via the physical layer. In one embodiment, the non-isochronous data 94b is configured by the physical layer E interface 59z (FIG. 5) so that the output data 104 can be processed by a repeater device for eventual transmission to destination nodes. As an alternative to using a repeater for the non-isochronous data, packet connections may be linked through media access control layer bridges. Preferably, the output data 104 is in a form such that it can be handled by repeater circuitry of types previously available. For example, when the non-isochronous data 94b within the physical layer is data which originated at the node 42b from an Ethernet MAC, the output data 104 is in a form such that it can be handled by a standard Ethernet hub repeater 60 such as Model DP83950 "Repeater Interface Controller" (RIC) available from National Semiconductor Corporation, Santa Clara, Calif. This configuration provides the advantage that the described network can be implemented without the necessity to replace all hub circuitry, in particular without the necessity for replacing hub repeater circuitry. In some embodiments, it may be desirable to provide the non-isochronous data 104 back to the circuitry 54 for return to the destination nodes without using previously-available repeater circuitry, such as in new network implementations where it does not matter whether the network is implemented so as to be able to use previously-available repeater circuits.

Figure 6:
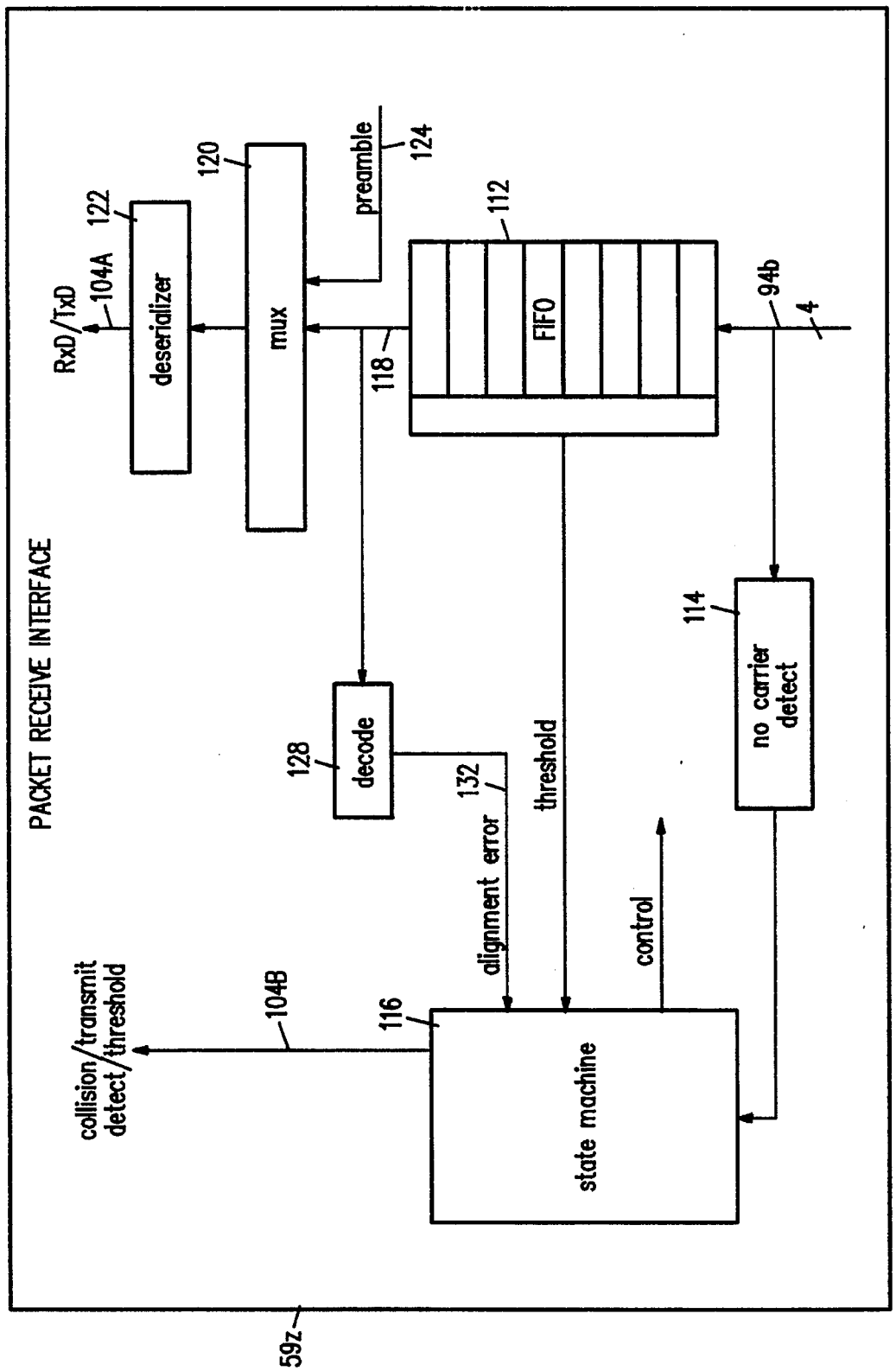
FIG. 6 is a block diagram depicting the packet receive interface, according to an embodiment of the present invention.

FIG. 6 depicts one implementation of an E interface 59z of a type which will receive the non-isochronous data 94b and provide outputs 104a, 104b of a type that can be processed by previously-available repeater circuitry 60z. The non-isochronous data is received in a first-in-first-out (FIFO) buffer 112 to smooth out data rates. Circuitry 114 detects "no carrier" symbols, provided to emulate Ethernet data packets, which will be used by logic circuitry or state machine 116 to output carrier detect signals. The output 118 from the FIFO 112 is provided to a multiplexer 120 and a de-serializer 122 to produce data output 104a. The multiplexer 120 can receive a preamble stream 124 to provide the proper preamble bits in the output data 104a. Output 118 from the FIFO 112 is also provided to decode circuitry 128 to recognize alignment error symbols and output appropriate signals 132 to state machine 116. Operation and components of the receive interface 59 are described more thoroughly in application Ser. No. 07/970,329, (Attorney File No. 8332-316/NS-2022), filed on Nov. 2, 1992 U.S. Pat. No. 5,361, 261. For purposes of example, it will be assumed that data from isochronous-source 48d is transmitted in the first 24 bytes of each frame represented by the "B" symbols in block 0 of Table IA (i.e. the first forty-eight "B" symbols in the frame structure).

Figure 7:
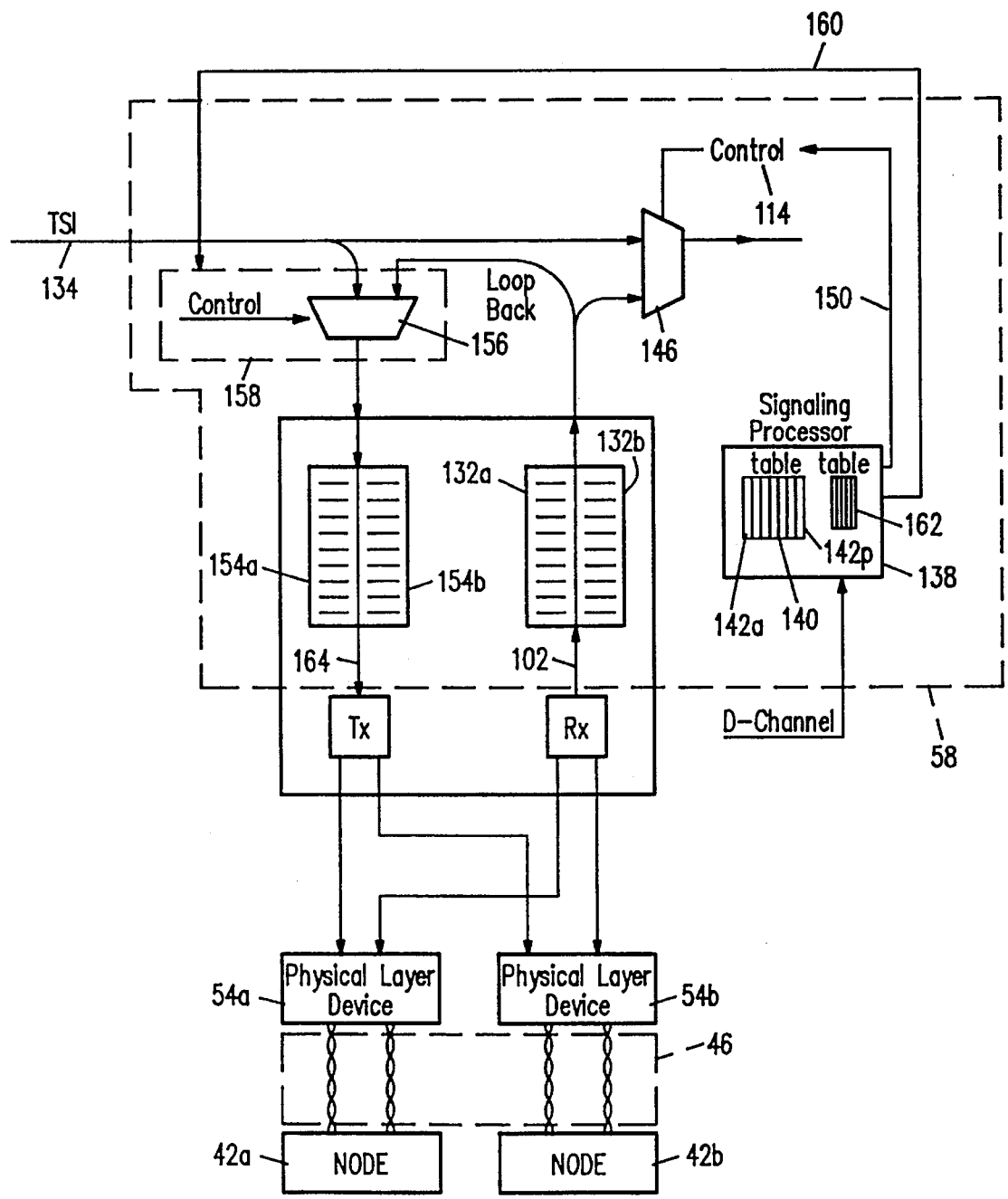
FIG. 7 is a schematic block diagram of a processor in the hub and its connection to hub circuitry for receiving and buffering data for placement on a high bandwidth bus and connections to nodes.

FIG. 7 is a schematic diagram of a hub signalling processor in a hub and its connections for receiving and buffering data onto a high bandwidth bus. In the embodiment of FIG. 7, the separated isochronous data 102 is stored in one of two buffers 132a, 132b. The timing of storage in the buffers 132a, 132b is coordinated with the 125 microsecond frame transmission timing so that data 102 from a first frame will be stored in the first buffer 132a during a first period of 125 microseconds and, during the next 125 microsecond period, the isochronous data 102 from the next frame will be stored in the second buffer 132b. In one embodiment, the data can be stored in the buffer 132 in the same order it is received, such that the eight bits represented by the first two "B" symbols in Table IA is stored in the first storage location of buffer 132a, that corresponding to the second two "B" symbols in Table IA is stored in the second location of buffer 132a and so on. Since the frame structure depicted in Table IA contains 96 bytes of isochronous data per frame, each of the buffers 132a, 132b has the capacity to store 96 bytes of data per node supported. After isochronous data from a first frame is stored in buffer 132, during the next 125 microsecond period (while the data from the next frame is being stored in the second buffer 132b) data which was stored in the first buffer 132a is transmitted onto a high bandwidth bus 134. The loading of the buffer 132 is dependent upon the number of nodes supported by the hub 44a. Bus 134 has sufficient bandwidth to carry the isochronous data output from a plurality of nodes which are connected to the hub 44a. In an embodiment in which the hub 44a is connected to 16 nodes, the bandwidth of the bus 134 must be sufficient to receive 1,536 bytes of data (i.e. 16 nodes×96 bytes per node) every 125 microseconds (i.e. every frame). This corresponds to a bandwidth of about 98304 Kb/sec.

Depending upon aspects of the system configuration, such as the number of nodes attached to a hub and the bandwidth dedicated to isochronous data, other embodiments could be provided with other bandwidths for the TSI bus 134. However, the 98304 Kb/sec bandwidth is particularly useful because it substantially matches the bandwidth employed in FDDI-II, making it particularly easy to port the data on the TSI bus 134 to a TSI ring 58f (FIG. 3A) in configurations where the TSI ring 58f is an FDDI-II system.

According to one embodiment, the data is conveyed from the buffer 132 onto the bus 134 in a time slot interchange fashion, and thus the bus 134 is referred to as a time slot interchange (TSI) bus.

As noted above, as data travels over the physical media, each 125 microsecond time period is divided into 512 equal time slots, each one of which is used to convey five bits of information (on average, conveying 4 bits of data and one timing bit). Thus, each 125 microsecond time frame on the physical layer/physical layer interface contains 512 time slots, each of which has a duration of about 0.2441 microseconds. In contrast, the data carried on the TSI bus 134 is transmitted in 125 microsecond time frames divided into 1,536 time slots, each of which has a duration of about 0.08138 microseconds. Thus, during a 125 microsecond time frame in which the data from buffer 132a is being exchanged onto the TSI bus 134, it is necessary to control the timing of the output of data from the buffer 132a such that a given one of the bytes stored in 132a is transmitted on to the TSI bus 134 at the proper slot of the 1,536 time slots. Which of the time slots is "proper" depends on the use which is to be made of the data and, in particular, the destination for the data. The destination for data, in the depicted embodiment, has been pre-established using the D channel information. The D channel information is sent to a processor 138. The D channel information which includes source and destination data is used to store values in a connection memory switch table 140. In one example, the connection switch table 140 contains two sets of 1537 locations, one for each one-way direction. The 1537 locations in the connection switch table contain bits to be used for control of the switching of the B slots either to another node or to the TSI bus.

In the example described above, it was assumed that the 24 bytes of data per 125 microsecond frame were conveyed in the first 24 B slots of the frame transmitted from 48d. Thus, the data from the source 48d will be stored in the isochronous data buffer 132. In this example, the destination of the data is 48b. Thus, the 24 B slots of data will be transferred to data buffer 154a and then transmitted to 48b in its corresponding first 24 B slots.

The 24 B slots could have been destined for the TSI bus in which case the 24 B slots in 132 would have been switched onto the TSI bus. A bit of the contents of the switch table would have controlled line 150 to control the multiplexer. Assuming the first 10 time slots of the TSI bus do not receive the B data which is destined for a node attached to the isochronous switching device during the first TSI time slot, the multiplexer control 150 will be "0" and no data will be output from the buffer 132 onto bus 134. The multiplexer 146 will merely convey along the TSI bus 134 whatever data was already on the TSI bus in the first time slot. This continues until the 11th time slot of the TSI bus, at which time the B data destined for a node attached to another isochronous switching device or hub begins to be output onto the TSI bus. During each of the next 24 TSI bus time slots, the control signal for multiplexer 146 will be "1" and a byte of data stored in the appropriate data location of buffer 132 will be output through multiplexer 146 onto the bus 134. Which data location of the buffer 132 is "appropriate" is determined by the D channel or call setup and can be indicated by a read pointer (e.g., contained in the switch table). Preferably, buffer 132 is a random access memory (RAM) and the read pointer will be determined according to the contents of the switch table location representing the TSI slot frame. After completion of conveying the 24 bytes onto the TSI bus, there will be no output from the buffer 132a to the TSI bus 134 during subsequent time slots of this TSI frame. In this way, time slots 11 through 35 for a frame on the TSI bus will be filled with data stored in the buffer 132a, i.e. the 24 bytes of data output by the isochronous source 48d. Since no other connection was set-up, the remaining time slot data (slots 36 through 1536) pass through the isochronous switching device.

FIG. 7 also depicts how the isochronous data is retrieved from the TSI bus 134 for transmission to a destination node. In one example, it is desired to retrieve the twenty-four bytes of data which are carried on the TSI bus during the time slots 11 through 35 of the frame transmitted on the TSI bus 134 and transmit these to isochronous sink 48b. Isochronous switching device circuitry 58 is provided for support of the node connections. In the present example, the data from the TSI ring is processed by circuitry 58 which is associated with node 1, i.e., the node with contains data sink 48b. Data carried on the TSI bus will be loaded into one of the buffers 154a, 154b. The two buffers 154a, 154b are controlled to provide timing similar to the timing of the buffers 132a, 132b described above. That is, during a first time frame, the first buffer 154a will be receiving data from the TSI ring while the second buffer 154b is outputting data (which was stored during the previous time frame) to physical layer circuitry 54a for transmission onto the physical media to the destination node 42a. During the next time frame, the roles of these buffers will be reversed such that data retrieved from the ring will be stored in buffer 154b and the data stored in 154a during the previous frame will be output for ultimate transmission to the destination node 42a.

Retrieval from the TSI ring is achieved by a multiplexer 156 controlled by a control signal 158 output over line 160 from the processor 138, relying on a connection switch table 162 in a fashion similar to that described for control of multiplexer 146. Control data is stored in an output table 162 according to destination information provided over the D channel to the processor 138. In general, unless there is a local loopback of data, the TSI bus data is loaded into the buffer 154. In the present example, during the first ten slots of the TSI bus frame, data from the TSI ring 134 may or may not be stored in the buffer 154a (depending e.g., on the absence or presence of a local loopback procedure for this data). During the next 24 TSI bus time slots, the control signal output from the processor causes data from the TSI bus 134 to be stored into the buffer 154a. During the remainder of the TSI time frame, data may or may not be provided from the TSI bus 134 to the buffer 154a. In this way, time slots 11 through 35 from the TSI ring are stored in the buffer 154a. During the following time frame, (during which data from the next time frame may be stored in the buffer 154b), only the data from the buffer 154a is output over line 164 for transmission to one or more destination nodes attached to hub 44a and specifically node 42a, in this example.

Although in the example just described, data is output from the buffer 132a onto the TSI bus 134 in the same order it was received, this is not necessarily the case. For example, an embodiment could be configured such that the processor 138 provides addresses via pointer 1210, (FIG. 12) to the buffers 132a, 132b to determine the order in which data stored in the buffers 132a, 132b is provided to the TSI ring 134. Pointer 1212 is used to indicate addresses for the buffers 154a, 154b, to determine the order in which data from the TSI ring 134 is stored into the buffers 154a, 154b. Similarly, it would be possible to use addresses output from the processor 138 to control the locations in which data retrieved from the TSI bus 134 is provided to the attached nodes.

In the embodiment depicted in FIG. 7, the receive table and transmit table 140, 162 are depicted as part of or directly writable by the processor 138. This type of configuration, however, can lead to inefficiencies. In particular, in the embodiment of FIG. 7, the processor cannot write into the tables 140, 162 during periods when the tables 140, 162 are being used for switching data.

Figure 12:
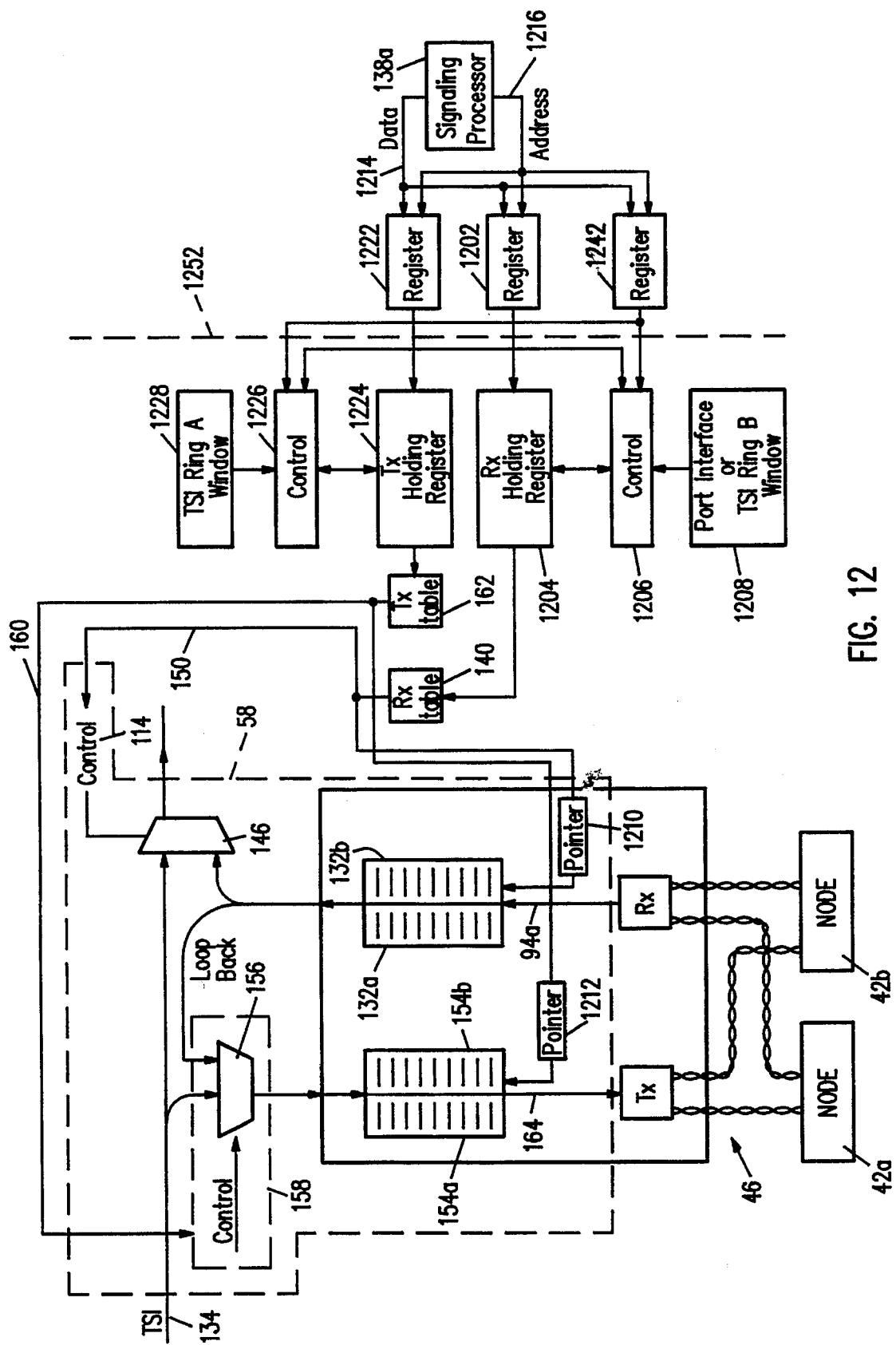
FIG. 12 is a schematic block diagram showing the connection of a processor to hub circuitry in an asynchronous fashion.

FIG. 12 depicts another configuration which permits the processor 138a to update the receive and transmit switch tables 140, 162 without such inefficiency. The processor 138a is preferably used to control a variety of operations in the isochronous system. Operations which the processor handles include the call control or signaling, maintenance activities at the isochronous physical layer and system level connections and/or TSI ring, switch table updating, status/ control bit processing and error bookkeeping. The processor interface is also responsible for passing on error conditions which occur on the TSI ring A, TSI ring B, or port interface.

The procedure for updating the receive table 140 will be described first. In this procedure the processor writes data and addresses (preferably, in a format to be described below) in a "burst" to a single register address 1202. The size of the data output in a burst is preferably selected so that all of the data from the burst can be loaded into the switch tables during a minimal number of TSI frames, preferably during a single TSI frame. In one embodiment, the window during which the switch tables are not being accessed is about 116 nanoseconds. In this embodiment, it is possible to do between about 15 and about 19 updates in a window of 116 nanoseconds. Accordingly, in one embodiment, the size of the transfer burst from the processor is about 16 words. In one embodiment, the processor can write up to 16 words of data into the register 1202 over data bus 1214 and address bus 1216. The 16 words from the register 1202 are stored into a set of 16 "shadow" registers known as a "receive holding register" 1204. Providing a shadow register simplifies the procedure from the point of view of the processor since the processor can do a write of all 16 words to a single address, rather than 16 separate addresses. The updates to the receive switch table 140 are written from the receive holding register 1204 during the appropriate times during the frame of data being passed through the switch. Preferably, parity is generated for the switch table data location after it is unloaded from the holding register to assure data integrity. Timing of the transfer into the receive switch table 140 is controlled by a control circuitry 1206 which receives timing information from the port interface or the TSI ring "B" window 1208. Based on the timing information, the control circuitry 1206 determines the beginning of a first time period during which the switch tables are not in use and initiates writing of the data from the holding registers 1204, 1224 into the switching tables 140, 162, respectively.

A similar structure is provided for updating the transmit table 162, including a register such as a 16 word register 1222, a transmit holding "shadow" register, having a set of 16 one-word registers 1224, control circuitry 1226, receiving timing information from a TSI ring "A" window 1228. Although FIG. 12 depicts registers 1202 and 1222 as separate registers, if desired, a single register can be used for the function of registers 1202 and 1222.

In the embodiment of FIG. 12, the switch table and the processor are asynchronous in the sense that they run in accordance with two different clocks. In one embodiment, the processor runs at a 33 MHz clock while the switch table runs at a 12.5 MHz clock. Thus, it is necessary to allow for transfer of data across an asynchronous boundary 1252. Since the registers 1202, 1204, 1222, 1224 can write to either side of the asynchronous boundary 1252, it is necessary to assure that two sequential writes according to different clocks are still able to provide data into the proper registers. There is a synchronization clock in the register itself as well as external to the register. According to one embodiment, the low pulse is sampled and the sampled signal is provided to a one shot which enables the controller 1206, 1226 to determine when the rising edge of the clock occurs. This scheme avoids the need for an asynchronous reset. When attempting to synchronize to the 33 MHz clock, after the write pulse goes high, a delay is instituted. In the absence of such a delay, if there is a write according to the 12.5 MHz clock, followed by a write according to the 33 MHz clock, the write before the 12.5 MHz clock will extend into the 33 MHz time. The delay pushes that time back until the actual time of the write.

In one embodiment, two types of words are sent to the registers 1202, 1222 and the holding registers 1204, 1224. Although a single holding register system for both received and transmit could be used, separate holding registers for the receive and transmit switch table updates provides for efficient updating of the appropriate switch table such that the updates of one switch table are independent of the other. An example in which this scheme is more efficient is where asymmetric calls or half-duplex calls are established. Selection of the appropriate switch table holding register is done through the switch table holding register data window and is done by the processor addressing the appropriate holding register.

Figure 13A:
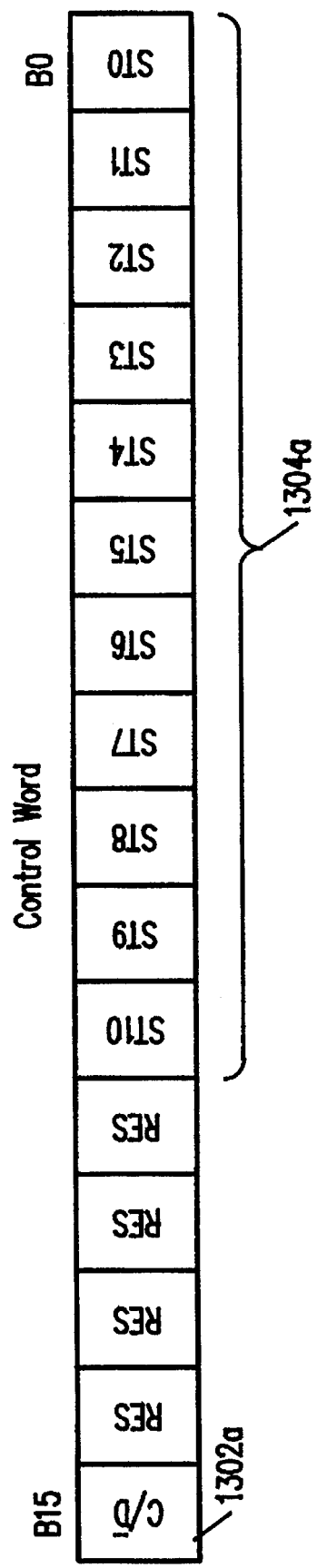
FIGS. 13A and 13B are block diagrams depicting the format for a control word and data word according to an embodiment of the present invention.
Figure 13B:
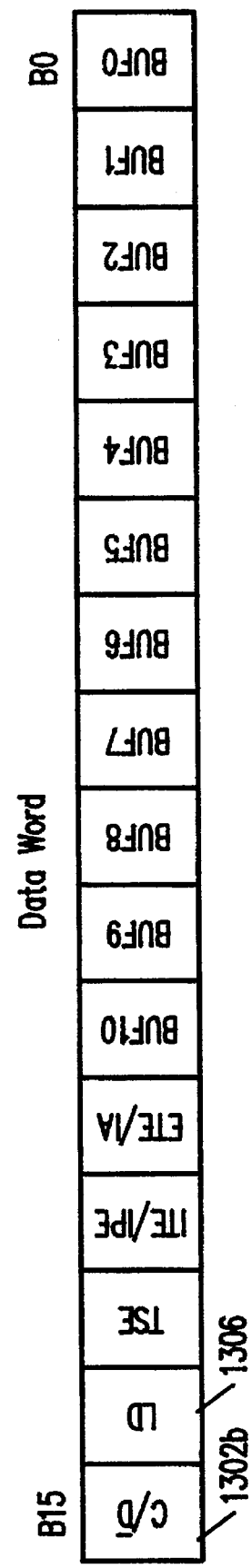

The words sent to the registers are control words and data words. The control word is used to indicate the switch table and the switch table address so that when the data words are loaded into the receive and transmit tables, it is known in which table (if more than one) and at what location in the tables these words should be stored. The data word contains all the data to be loaded into the switch table data location. The control word and data word also contain additional information. FIGS. 13A and 13B depict the structure of a control word and a data word according to one embodiment. Table IV indicates the meaning of the bit indications in FIGS. 13A and 13B.

The receive switch table, according to the depicted embodiment, requires the switch table location address (corresponding to a time slot in a TSI ring), the receive buffer address (corresponding to a port B channel or TSI ring B time slot), external transmit enable (ETE) bit, internal transmit enable (ITE) bit, and a tri-state enable (TSE) bit. The transmit switch table, according to the depicted embodiment, requires the switch table location addressing (corresponding to a port B channel or TSI B time slot), the transmit buffer address (corresponding to a TSI ring A time slot), external transmit enable or idle address bit (depending on the embodiment) (ETE/IA bit), idle pattern enable (IPE) bit, and TSE bit. In Table IV "IMC" refers to Isochronous maintenance channel which is part of the TSI cycle header and "idle address" refers to external transmit enable/or idle address (depending on the embodiment). The data and control words output by the signaling processor are provided according to operating software of the processor. The operating software can obtain information regarding the network addresses of each of the end points (nodes) and the bandwidth allocated to each. It can handle channel allocation on this basis. Based on the network connection table, all connections within the local system are established, released, and monitored by the processor 138a.

A single switch table slot update requires one control word and one data word. The control/data C/$\overline{D}$ bit 1302a, 1302b indicates whether the word is a control word or a data word. This bit is also used in conjunction with permitting multiple data words to be associated with a single control word. Thus, a switch table update may contain multiple words where the first word is the control word and the remaining words are data words, as indicated by the control/ data C/$\overline{D}$ bit. The control word switch table address 1304a is used as the base address for the first data word (i.e., the data word following the control word). After the first data word is loaded into the switch table, the switch table address is incremented by a specific count and (if more than one data word follows the control word) the next data word is loaded into the location of the switch table indicated by the incremented address. The amount by which the address is incremented is preferably programmable, for example, by setting a bit in a register 1242 under control of the processor. In one embodiment, the increment count is selectable to be either 1 or 16, with the default count preferably being 16. Providing for a programmable count is useful in different types of switching. By incrementing the address by one, the switching of data on the TSI ring in consecutive slots can be set up. The preferable count of 16 is directly associated with mapping of consecutive data in TSI slots to a single isochronous/Ethernet (isoEnet) node or vice versa. By incrementing the address by 16, the switching on consecutive slots corresponding to a particular node can be set up. For switching to a TSI ring, incrementing the switch table for that ring by 1 allows consecutive slot switching. For switching to a port, incrementing the switch table address by 16 maps the data to the port locations in the switch table.

As an example of the use of the C/$\overline{D}$ bit for updating multiple words, if a switch table update is to contain six consecutive switch table entries, seven 16-bit words for the switch table update are required in the depicted embodiment. The first 16-bit word contain the starting switch table location (indicated by the control bit C/$\overline{D}$ 1302a being set to 1). The next 16-bit word contains the data information. The remaining five data words, for a total of six switch table updates, represents one slot of the switch table. In this example, these are to be stored in consecutive slots, and the offset from the first switch table location is incremented by one each time data information is read from the holding register. If, for example, the switch location started at location 1000, the first switch table data would be loaded into location 1000 and the final switch table data into location 1005. The end of the consecutive data is indicated when the control bit 1302a is set indicating a new switch table update sequence (or the LD bit 1306 is set, indicating the last data word in the switch table update burst, as described below).

If the processor has less than 16 updates to perform, it can assert the last data (LD) bit 1306 in the last word it writes to the switch device. Although it is conceivable one could use the processor 138a to keep track of the transfer from the holding registers 1204, 1224 to the switching tables 140, 162, it is preferred to relieve the processor 132a of this burden so that the processor will be free to perform other tasks during the transfer into the switching tables 140, 162. Additionally, the LD bit is used to provide to the local circuitry an indication of the end of the switch table update providing further efficiency.

Preferably, the processor 138a is configured to increase or maximize efficiency of update data transfer, e.g., by delaying such transfers until a full or nearly full register (i.e., 16 words) can be transferred. In general, one update of 16 words is more efficient than eight updates of two words each. However, in cases where fewer than the optimal number of update words have been waiting for a sufficient amount of time, the update process should be undertaken regardless of sub-maximal system efficiency.

In normal operation, the switch tables 140, 162 are in use the majority of the time, i.e., during a majority of a TSI cycle. According to the present embodiment, it is not necessary for the processor 138a to wait until the non-use portion of the TSI cycle before outputting the data for updating the switch tables. The updates can be written by the processor whenever the processor has new data to be written into the switch tables and no current updates are taking place, despite the fact that the actual time the updates can be performed is limited to a small amount of time during the TSI frame. After the processor has loaded data words and control words into registers 1222, 1202 and these data have been loaded into the holding registers 1224, 1204, the data will be held in the registers 1224, 1204 until such time as the switch tables 140, 162 are not in use. At this point, the control circuits 1206, 1226 will initiate writing of the data in the data words stored in the holding registers 1204, 1224 into the respective switching tables 140, 162. Preferably, the data words will be read out in the order they were written in. If a word in the holding table is a control word, the new switch table address contained in the control word is stored for use in writing the subsequent data into the switch tables 140, 162. If a data word is read out, after a control word, the data is written into the switch table at the address previously stored. When the data has been written into the switch table at such address, the stored address is incremented by the appropriate value, as described above, to determine the location of the next data word in the holding register. Once all the updates have been performed, the processor is preferably interrupted to indicate that it can send more switch table update information to the switch device.

Preferably, the processor 138a, after outputting a burst of data and control words, will typically be prevented from attempting another output of control and data words until completion of the transfer of the previously output words into the switch tables. Once an LD bit is output into the registers 1222, 1202, 1224, 1204 (or the maximum number of words, such as 16 words, have been output), it is preferred that no more processor writes to these registers be allowed until the current set of updates have been written into the switch table 140, 162.

According to one embodiment, the processor will output control and data words to the registers 1202, 1222 only in response to an interrupt. In this embodiment, after data and control words are sent to the holding registers 1204, 1224 an "empty" bit in a register 1242 will be set to "0" to indicate that the switch table update process should not be interrupted until it has completed whereupon the bit is set to "1" indicating that the holding register is empty. This bit of the register 1242 will be set to "1" once the updating of the switch table 140, 162 has been completed. After the switch table holding register has been emptied 1204, 1224, and the "empty" bit of the register 1242 has been reset, an interrupt to the processor will be initiated to indicate to the processor that further data and control words may be loaded.

Figure 18:
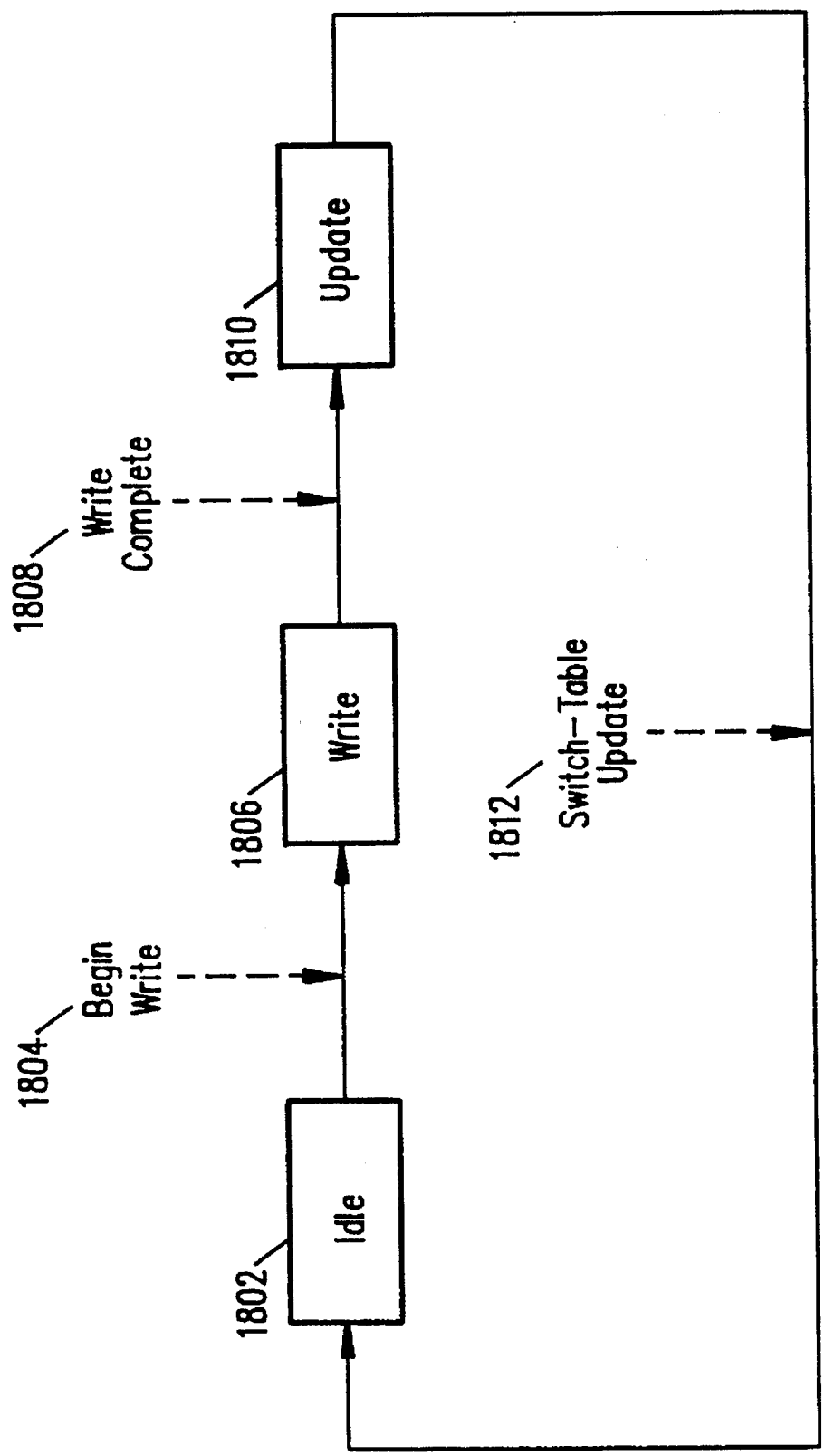
FIG. 18 is a block diagram of an asynchronous update state machine.

According to one embodiment, control of the timing involves a state machine. Initially, the state machine is in an idle state 1802 (FIG. 18) in which there are no new updates and the processor is not performing any writes to the register. Once the processor begins writing 1804 to a register, the machine enters the write state 1806. The machine will remain in the write state until the writing is finished 1808 (either indicated by setting the LD bit or upon sending 16 full data and control words). Updates are prevented from being initiated until there is a successful exit from the write state. This is to prevent a situation in which the processor stores some of the words for an update but does not complete the update burst. In such a situation, if an update were attempted based on the contents of the holding register at that point, it is possible that updates would be performed on the basis of a mixture of old data and new data, with unpredictable results. Once the processor has finished writing 1808, the state machine enters the update state 1810. During the update state, the processor is prevented from writing more data into the registers since this could overwrite some of the data which was to be stored into the switching tables. After the switching tables have been updated 1812 according to the information in the holding registers, the state machine will return to the idle state 1802 and an interrupt will indicate to the processor 138a that additional updates can be sent to the registers 1202, 1222, if desired.

Isochronous switching circuitry 58 can also be provided with a local loopback capability. The local loopback capability permits circuitry 58 to transfer data directly from the receive buffer 132 to the transmit buffer 154 without first placing the data onto the TSI ring 134, thus freeing TSI bus bandwidth. This is the case, e.g., when data from a source attached to hub 44a is destined to another node attached to hub 44a. Local loopback capability is described more thoroughly in commonly-assigned application Ser. No. 07/969,910, abandoned, (Attorney File No. 8332-317/NS-2025,) titled "LOCAL LOOPBACK OF ISOCHRONOUS DATA IN A SWITCHING MECHANISM", filed on Nov. 2, 1992 and incorporated herein by reference. Local loopback capability is useful, for example, when both an isochronous source and an isochronous sink are connected to the same hub. For example, in the configuration depicted in FIG. 2, both the video camera isochronous source 48d on node 2 and the video monitor isochronous sink 48b on node 1 are connected with the same hub 44a. Local loopback can be used to provide data to the monitor 48b for displaying images received by the video camera 48d, substantially in "real time," but without placing the data on the TSI bus 134, thus allowing the bandwidth to be used by other connections.

An example of the flow of non-isochronous data will now be given. In this example, the non-isochronous data from source 48c on node 2, 42b, is intended for the non-isochronous sink 48g on node 3, 42c, and thus the E data is transmitted via 50b across 46c to 54b which demultiplexes the E data and conveys it to 60. Circuitry 60, in turn, conveys the E data to 54c which multiplexes it into the frame and transmits it across 46f to 50c which demultiplexes the data and provides it to 48g.

After the hub has received data from a node and conveyed it to a location for transmission to the destination node or nodes, the data which is intended for the destination node may need to be placed in a form suitable for transmission across the physical media via the physical layer if intended for an attached node.

In the case of data 166 output by an Ethernet repeater 60 the data is transformed by an E transmit interface 168 into a form suitable for multiplexing with other data streams, such as an isochronous data stream 66b and D channel and M channel data bits 66c.

Figure 8:
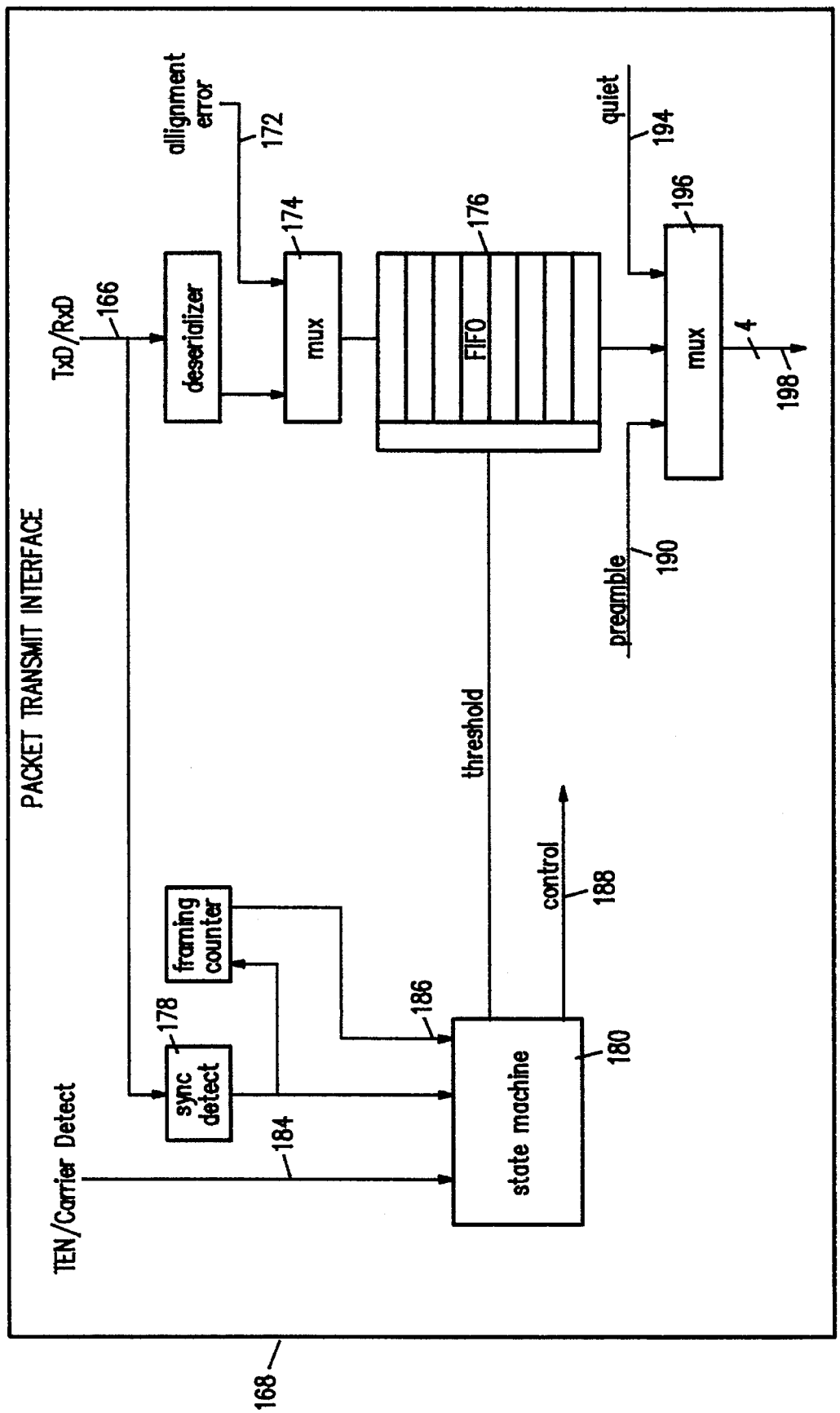
FIG. 8 is a schematic block diagram of a packet transmit interface according to an embodiment of the present invention.

An example of an E transmit interface 168 is depicted in FIG. 8. The transmit interface depicted in FIG. 8 is in general, the functional inverse of the E receive interface 59z depicted in FIG. 6. Data 166 could be supplied either in serial or parallel form. If in serial form, the data 166 is de-serialized and is then combined with any necessary alignment error bits 172 in a multiplexer 174, the output of which is conveyed to a FIFO 176. A sync detect circuit 178 extracts synchronization information from the repeater output 166 for conveying to a state machine 180. The state machine 180 also receives carrier detect information 184, framing counter information 186, and provides control signals 188 to the FIFO 176. Data is extracted from the FIFO 176 as needed to make up a frame for transmission over the media 46 as described below. The data output from the FIFO 176 is multiplexed with preamble bits 190 and "quiet" (null carrier) bits 194 by a multiplexer 196. Operation of the E transmit interface is described more thoroughly in the application Ser. No. 07/970,329, (Attorney File No. 8332-316/NS-2022).

Figure 9:
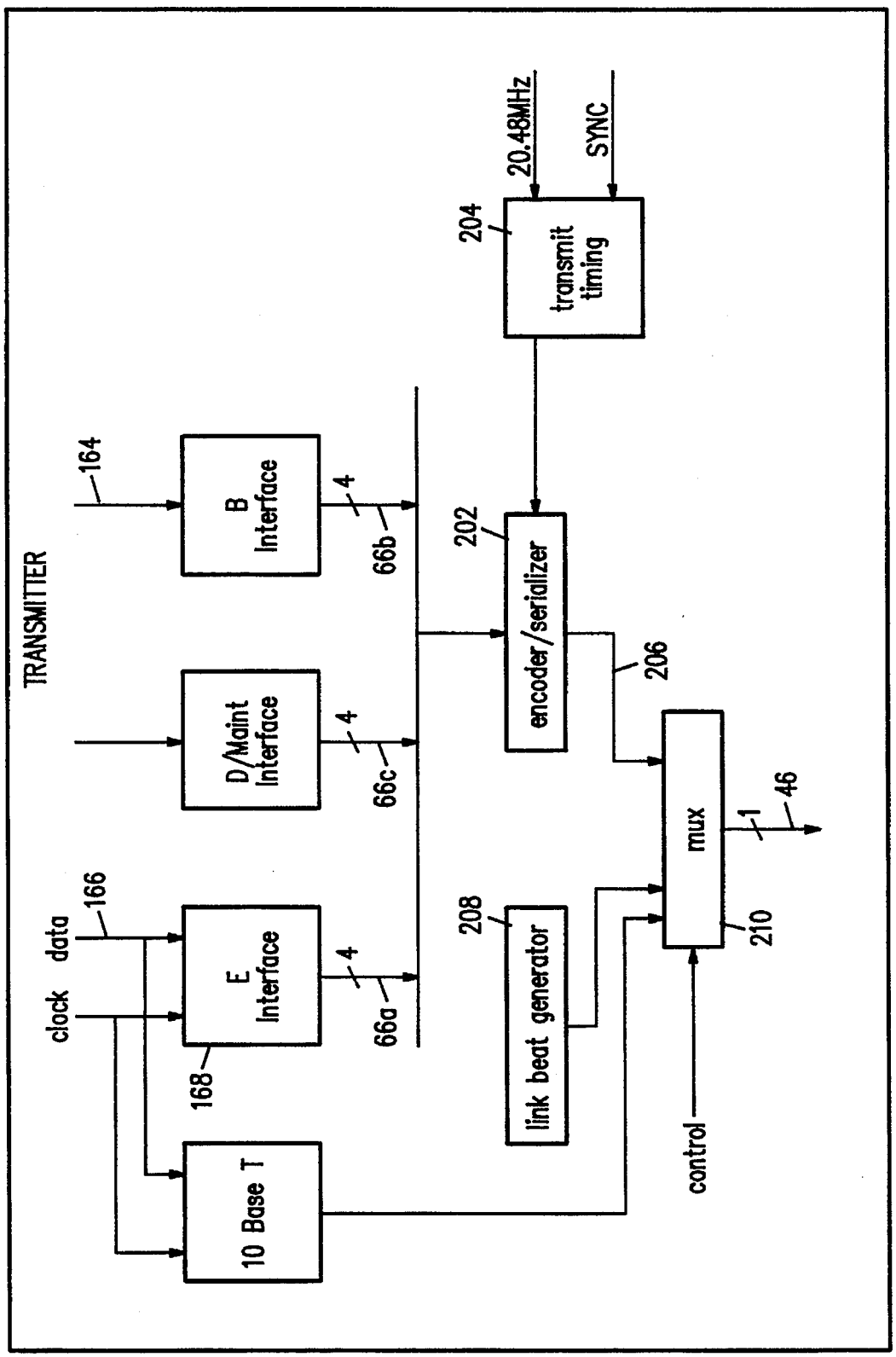
FIG. 9 is a schematic block diagram of a transmitter circuitry.

The data 66a output from the E transmit interface 168 is provided along with isochronous data output 66b and maintenance and D channel data 66c to encoder serializer circuitry 202, as depicted in FIG. 9. The encoder/serializer 202 is configured substantially like the encoding circuitry found in the node and depicted in FIG. 4. Specifically, the encoder/serializer 202 provides a multiplexer for combining the three streams of data 66a, 66c, 66b, a four/five encoder, an NRZI encoder, and pre-emphasis circuitry. The timing of transmission is controlled by transmit timing circuitry 204. Output 206 from the encoder/serializer is selectively combined with link beats from a link beat generator 208 by multiplexer 210 for purposes of link end point detection, as described more thoroughly in application Ser. No. 07/971,018, (Attorney File No. 8332-319/NS-2026). The data sent from the hub 44a to the nodes 42 is sent in a frame format which is preferably substantially the same as the frame format used for the data sent from the nodes 42 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a demultiplexer 92. Decoded and de-multiplexed data is then delivered to the various data sinks in the nodes 42.

The frame structure of Table IA provides an allocation of bandwidth such that the data rate for the non-isochronous data are compatible with e.g. 10 Base T Ethernet data rates. Another frame structure usable in connection with the present invention is shown in Table IB. Other types of frame structures could be used in connection with other isochronous and/or non-isochronous data sources and sinks such as token ring non-isochronous sources and sinks, in which case a different frame structure can be used to provide an allocation of bandwidth suited for the particular purpose.

The time-multiplexed data is then encoded by an encoder 72. In the depicted embodiment, the encoder performs four/five encoding. One particular form of four/five encoding conforming partially to the ANSI X3T9.5 standard, is depicted in Table II. The five bit code symbols of the particular four/five implementation have been chosen so as to maintain the AC balance of the physical medium, and to minimize the frequency spectrum of wave forms as they are transmitted along the physical medium. This eases the task of the data decoder, which is typically a phase lock loop device, in recovering the data and the transmission clock. These patterns, when properly combined, have a maximum of three bit times with no transition. With a bit rate of 48.8 ns, the minimum transition rate is 3.41 MHz or 146.5 ns between transitions.

The encoding scheme depicted in Table II is described in greater detail in commonly-assigned application Ser. No. 07/970,329 (Attorney File No. 8332-316/NS2022), titled "FRAME-BASED TRANSMISSION OF DATA", filed on Nov. 2, 1992 and incorporated herein by reference. A standard Ethernet system uses the absence/presence of a carrier signal to indicate the start of a packet. In the present system, the frames are transmitted continuously, one after another, and there is not significant period during which there is a lack of signal on the physical media. Thus, a "no Ethernet carrier" symbol (Table II) is used to denote lack of an Ethernet carrier in the output from the Ethernet MAC. According to the present frame structure, data is expected to appear in an integral number of 4-bit nibbles. This may not be the case if an Ethernet packet suffers from the addition of "dribble bits" which do not make up an integral number of nibbles. In this case, a code symbol "unaligned data" is transmitted.

The results of the four/five encoding is then further encoded by encoder 74 using a non-return to zero, inverted (NRZI) scheme. The NRZI encoder modifies the bit stream by inverting the output whenever a logic 1 is transmitted. Logic 0 produces no change in state. The four/five-NRZI encoding is particularly useful in networks in which a non-isochronous source is a 10 Base T Ethernet source. This is because the four/five-NRZI encoding provides for transmission at a signaling rate such that the data rate for the non-isochronous portion of the data is substantially compatible with the data rates provided and expected by the Ethernet MAC. In typical Ethernet systems, a data rate of 10 Mb/sec is provided. In standard Ethernet systems, the data provided at this rate is encoded using a differential manchester scheme using two transition times to transfer one bit of data. On average, this scheme provides one clock bit per every bit of data. Thus the standard Ethernet data rate of 10 Mbit/sec, after manchester encoding, results in a signalling rate of 20 Mbit/sec.

Comparing the standard Ethernet signalling rate and data rate to that provided by the frame structure of Table IA and encoding of Table II, it is seen that in the present scheme, a frame of data contains 313 "E" symbols or 1252 E bits. By transmitting frames at a rate of one frame every 125 microseconds, the present scheme has a capacity for transmitting 10,016 Mbits/sec of Ethernet-sourced data interspersed with 6144 Kbits/sec of isochronous data. Thus by using the four/five-NRZI encoding, the data rate and signaling rate is within two and one-half percent of the signaling and data rate used by 10 Base T, allowing both isochronous traffic and Ethernet traffic to travel over existing physical media without seriously degrading the data rate of the Ethernet traffic, compared to previous standard Ethernet systems. Moreover, provision of substantially standard Ethernet data rates contributes to the ability to implement the described network without the necessity for replacing in-place MACs or repeater circuitry. The ability to convey data frames substantially at the signaling rate used by previously-available systems, such as standard Ethernet, contributes to the ability to implement the described network without the necessity to replace in-place physical media, such as twisted pair media.

Although the four/five-NRZI encoding is particularly useful in connection with an Ethernet non-isochronous source, other types of encoding or decoding can also be used in the present system, including, e.g., a scheme encoding 8 bits into 10 bits. Furthermore, additional types of encoding or decoding can be provided tailored to the requirements of other non-isochronous sources/sinks, such as token ring non-isochronous sources and sinks. In connection with the described embodiment, the more important aspect of encoding is not as much the particular encoding scheme used as selection of an efficient coding scheme and particularly a scheme having sufficient efficiency that the bandwidths of both the incoming non-isochronous data 66*a* and the incoming isochronous data 66*b* can be accommodated on the physical media without seriously degrading bandwidth formerly available for the non-isochronous data. The four/five encoding scheme is more efficient than differential manchester encoding scheme, in this regard, since it provides four bits of data for every five potential transitions so, on average, that one clock bit is provided for every four bits of data (as opposed to one clock bit for every data bit in differential manchester encoding). Thus, whereas in previous standard Ethernet systems, the differential manchester coded data took up substantially the entire bandwidth of the twisted pair media, which has a maximum effective signalling rate of about 20 Mb/sec, the four/five-NRZI encoding permits physical media having the same bandwidth to accommodate both the 10 Mbit/sec Ethernet data stream and a 6144 Kbit/sec isochronous stream, as well as a 64 Kbit/sec D channel, a 96 Kbit/sec maintenance channel, and 64 Kb/sec for the frame synchronization pattern. These characteristics are summarized in Table III.

As an example, it is assumed that the data rate output from the isochronous source 48*d* is 1,544 Mb/sec. However, the frame structure noted above provides an isochronous bandwidth capability of 6,144 Mb/sec. Thus, the single isochronous source 48*b* in the present example can be entirely accommodated using only 48 of the 192 "B" symbols per frame (i.e. 24 bytes per frame or 192 bits per frame). This leaves 72 "B" symbols per frame unutilized by source 48*d*. Thus, it would be possible to use the isochronous channel of this embodiment to carry isochronous data from four isochronous sources, each outputting data at a rate of 1,544 Mb/sec. It would also be possible to use the described embodiment to carry the output from three isochronous sources, each outputting data at a rate of 2.048 Mb/sec (i.e. the CEPT European standard). A basic rate ISDN Channel could be supported by using three 64 Kb/s slots within the isochronous channel. It would also be possible to transmit data from up to ninety-six isochronous sources, each outputting data at a rate of 64 Kb/s. Thus, it is possible to use the network to transfer data from a single isochronous source outputting at a rate of 6.144 Mb/s or the isochronous bandwidth available may be allocated with a granularity of 64 Kb/s, i.e. it may be split into multiples of 64 Kb/s.

The output from the NRZI encoding devices is sent to pre-emphasis circuitry 76. The pre-emphasis circuitry compensates the signal transmitted onto the physical medium to reduce the jitter. The pre-emphasis stage is optimized for the frequency spectrum employed by the present system. The data output by the pre-emphasis circuitry 76 is sent to a transmitter or driver and the signal is transmitted over the physical medium 46*c*. The physical medium 46*c* can be any of a number of media types including twisted pair, coaxial or fiber optic cable. In one embodiment, the network is configured so that the desired data rates can be achieved within the bandwidth inherent in twisted pair media and it is anticipated that at least initial use of the disclosed embodiments will make frequent use of twisted pair as media in order to take advantage of twisted pair networks already in-place. Although a number of configurations for the physical media are possible, certain features of the network are preferably configured to accommodate the characteristics (including the delay characteristics) of twisted pair wiring having a maximum length of approximately one hundred meters.

Figure 10:
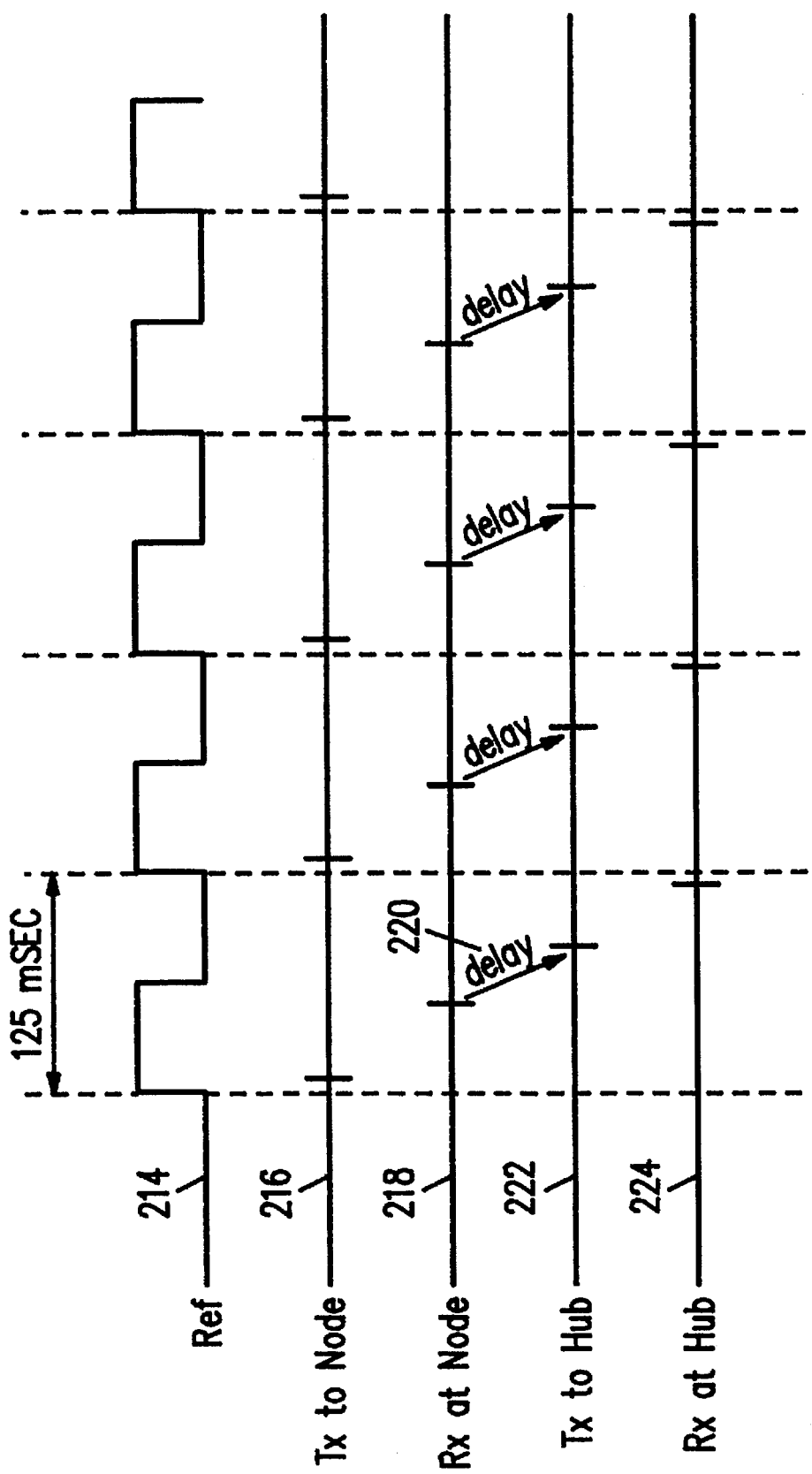
FIG. 10 is a timing diagram showing the relative timing of transmissions and receptions at the hub and nodes.

In one embodiment, it is desirable to control the timing of the transmissions from the nodes 42 to the hub 44 and those from the hub 44 to the nodes 42 to assist in reducing delay, jitter and minimizing the amount of buffering memory required. In particular, it is desired that the hub 44 should be able to transmit to the nodes, over media 46*a*, 46*c*, 46*e* at about the same time that data transmitted from the nodes over media 46b, 46d, 46f is received at the hub. FIG. 10 depicts a scheme for achieving this type of timing. As shown in FIG. 10, the timing can be synchronized with a 125 microsecond reference clock signal 214. In this example, the reference signal 214 provides an ascending clock edge every 125 microseconds. The reference signal can be provided by any of a number of sources. Preferably, an embodiment is configured to permit a reference signal 214 to be synchronized to an external clock reference, such as a reference signal from a wide area network or from a FDDI-II ring. The reference signal can be supplied through one of the nodes and transmitted to the hub for distribution to the other nodes, or can be supplied directly to the hub for distribution.

In applications where multiple wide area connections are made, one of the telephone connections (such as T1) can be chosen as the LAN reference. Connection can be made to the other WAN interfaces via data storage and buffers. The buffers would contain multiple frames of data to accommodate the phase and frequency skews between the frame structures apparent upon these connections and the chosen reference. The frame structure derived from the wide area network connection is subject to frequency jitter. According to one embodiment, the present network is able to accommodate this jitter provided that it is within specified bounds, and accordingly the jitter accommodation will not degrade the integrity of the isochronous channels.

Each node and the hub device will contain its own high-accuracy transmission encoding clock, typically a crystal oscillator. Thus, when viewed at the bit level, the links 46 are asynchronous to each other, being referenced only to the sourcing clock oscillator. Thus, according to one embodiment, the synchronous frame structure is conveyed over asynchronous links.

Figure 17:
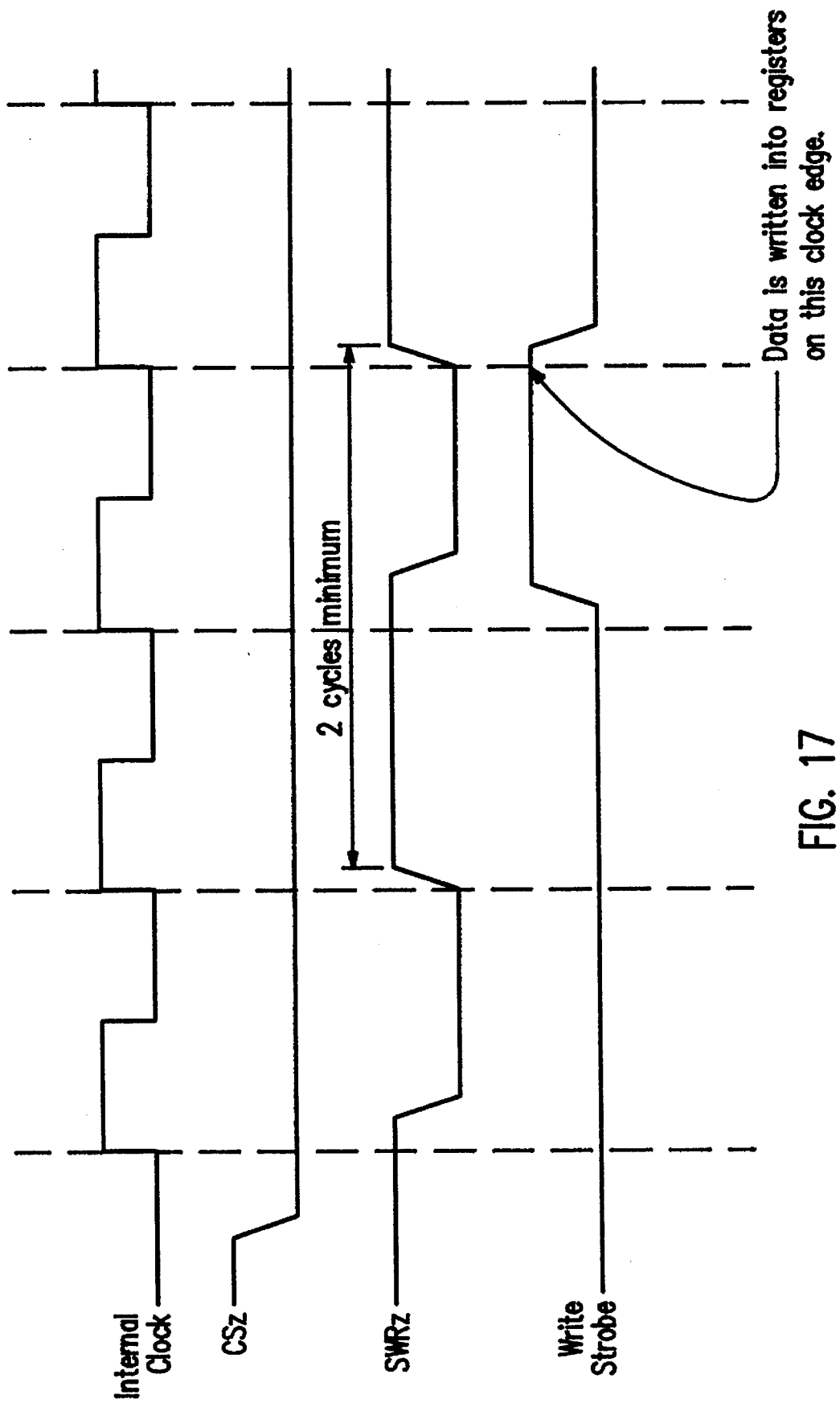
FIG. 17 is a timing signal showing write timing according to previous devices without a dual register/address bank.

Because there are at least two timing schemes being used simultaneously (the timing driven by the external clock reference, and the processor timing) a scheme for synchronization becomes necessary. One problem associated with synchronous design is interfacing to the real world which is asynchronous by nature. A common example of this is a typical CPU interface. There are commonly five signals associated with a CPU bus. One example of a set of CPU signals is as follows: Data Bus (D[15:0]), Register Address (RA[3:0]), Chip Select (CSz), Slave Write (SWRz), and Slave Read (SRDz). Due to the fact that the control signals (CSz, SWRz, SRDz) are asynchronous with respect to the system clock of an integrated circuit, all input signals must be properly synchronized to the internal clock. This synchronization process takes a maximum of two clock cycles to occur (FIG. 17). The purpose of the synchronization is to eliminate the possibility of metastability on any internal flip-flops. One embodiment uses a method for writing data into a synchronous design and still achieves a throughput of one data write per internal clock cycle. It should be noted that this method is not limited to a CPU being interfaced to registers. It could be used in any application in which external signals, which are asynchronous, need to be interfaced to a synchronous logic design.

The interface logic between the synchronous internal logic and the asynchronous control signals consists of a mixed synchronous-asynchronous design. A disadvantage in using this interfacing technique is that a small portion of the logic must be asynchronous. This disadvantage is believed to be outweighed by the gains of using this technique. One advantage is the throughput of one data write per clock cycle throughput.

Figure 14:
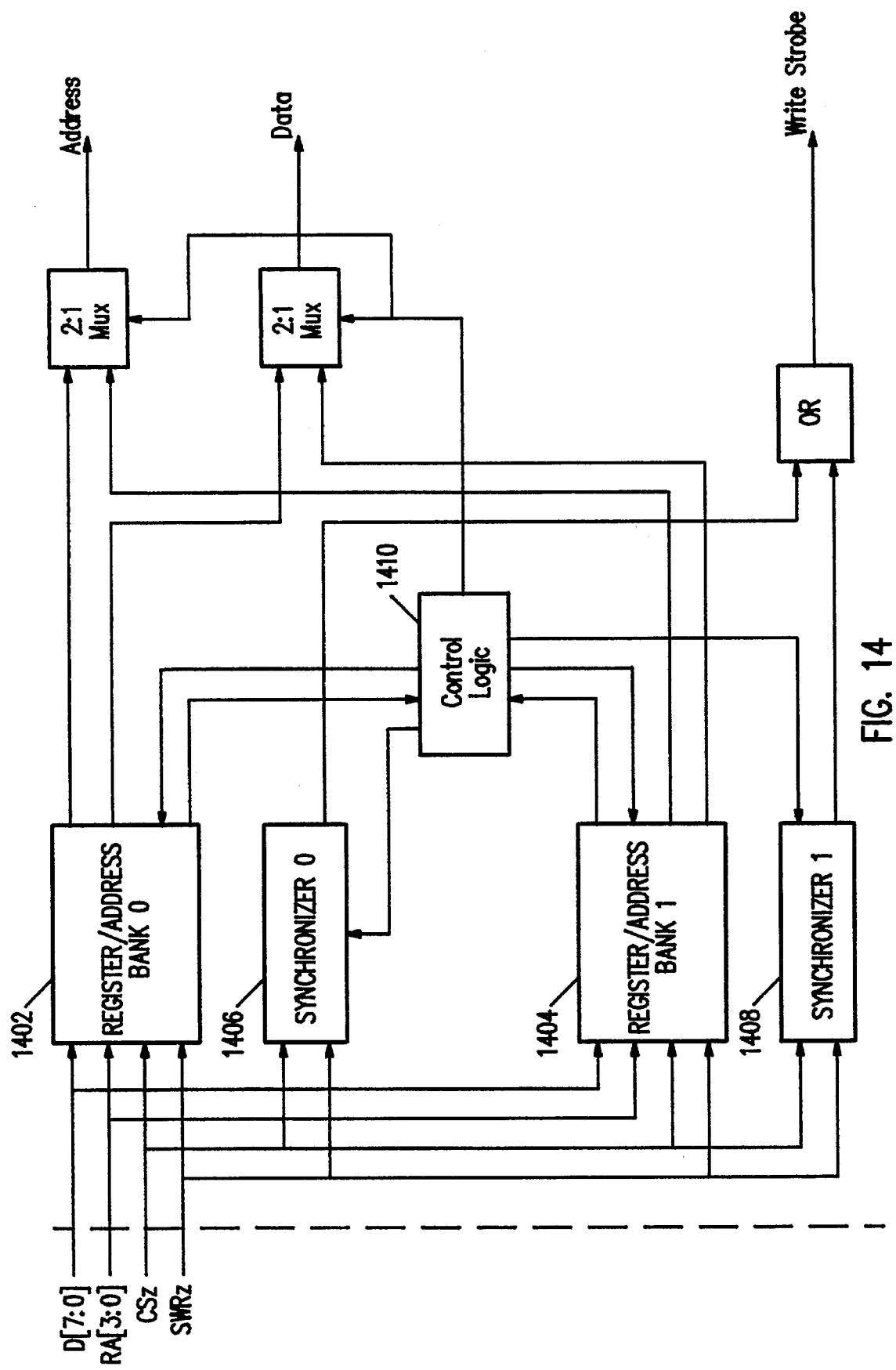
FIG. 14 is a block diagram showing synchronous internal logic for accommodating asynchronous external signals according to an embodiment of the present invention.
Figure 16:
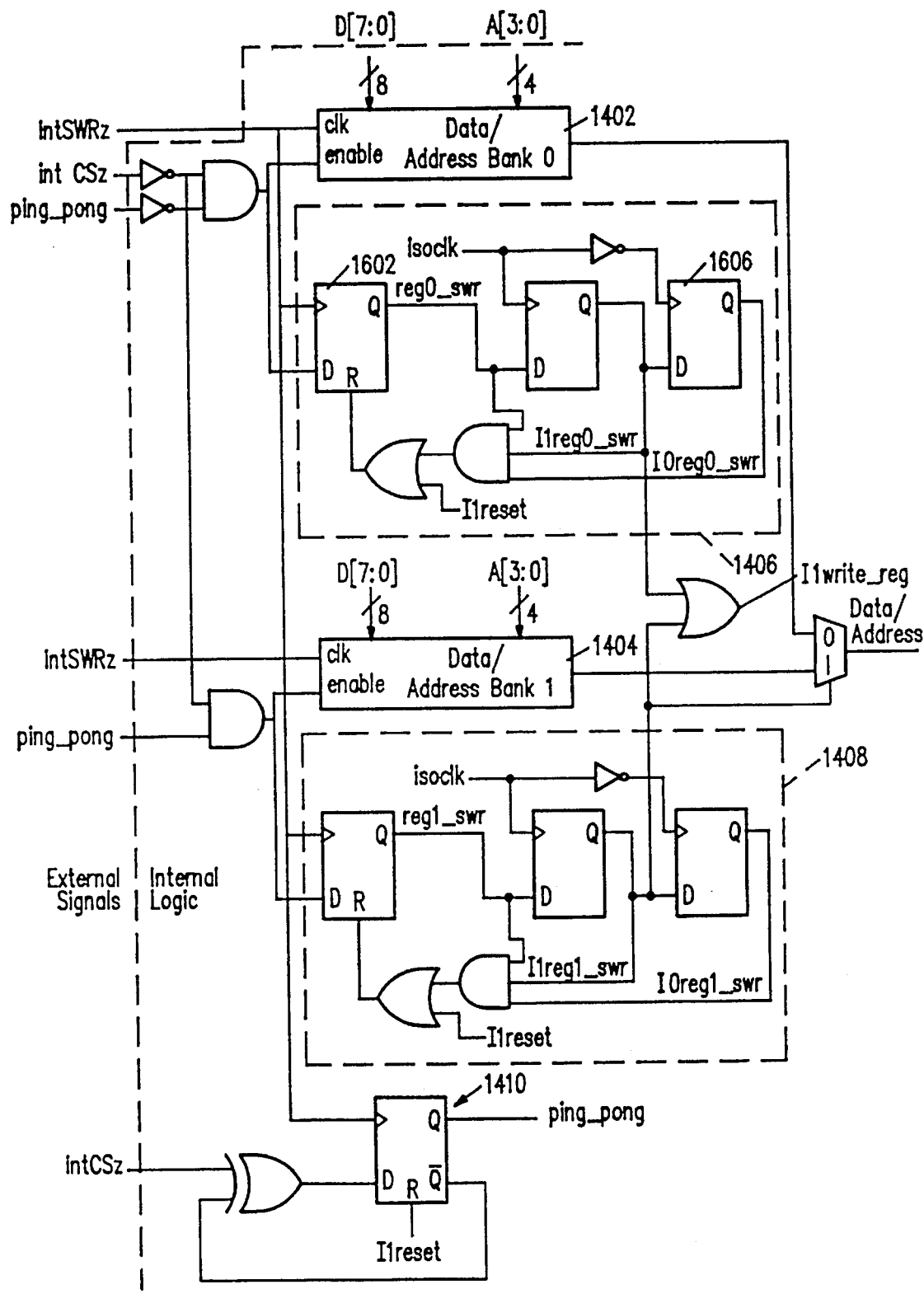
FIG. 16 is a schematic block diagram showing details of components of FIG. 14.

There are five main blocks which are involved. These blocks are shown in FIG. 14. The five blocks are: Register/Address Bank 0 1402, Register/Address Bank 1 1404, Synchronizer 0 1406, Synchronizer 1 1408, and Control Logic 1410. Register/Address Bank 0 and Register/Address Bank 1 are identical blocks of logic as are Synchronizer 0 and Synchronizer 1. FIG. 16 shows a more detailed block diagram of one embodiment.

Figure 15:
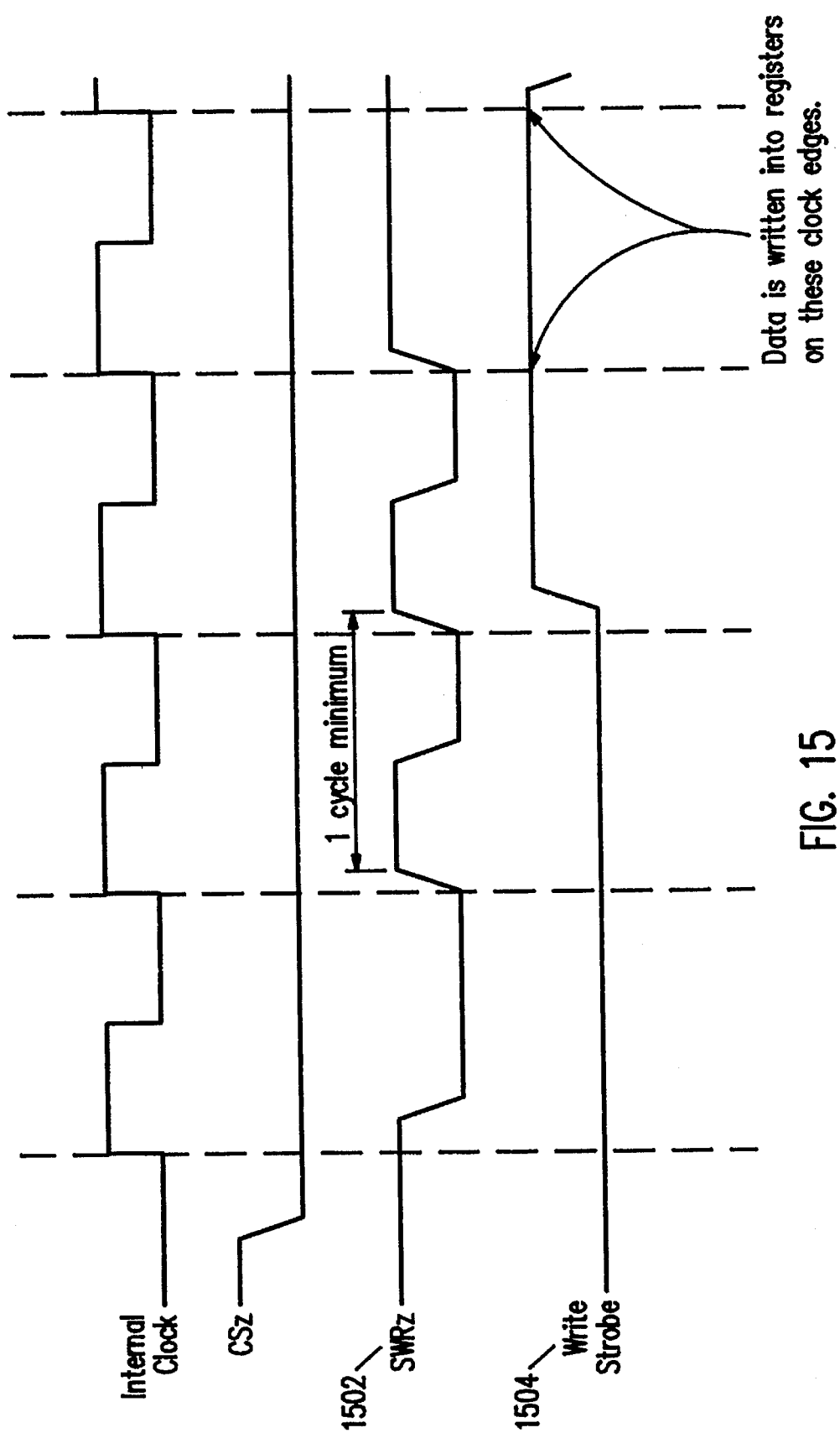
FIG. 15 is a timing diagram showing write timing with dual register/address banks.

In operation, the processor writes to a register by asserting the SWRz control signal. The address and data will be stored in Register/Address Bank 0. At the same time a synchronization process starts to take place in Synchronizer 0. While this synchronization is taking place another processor write can occur one clock period after the previous write. The address and data from this write will be stored in Register/Address Bank 1. At the same time a synchronization process starts to take place in Synchronizer 1. During the time that the second synchronization occurs, the first synchronization will have finished and SWRz 1502 will assert the write signal (write state 1504 (FIG. 15). When this signal is sampled high synchronously by the internal logic, the data which is in Register/Address Bank 0 will be written into the internal logic. When the second processor write has finished, the next write may occur as soon as one clock period from the previous one. This time, the address and data will be stored back into Register/Address Bank 0 and synchronizer 0 starts. Again, during this synchronization process, the data that is in Register/Address Bank 1 is written to the internal logic. This process can then repeat at a rate of one CPU write per internal clock cycle. There are no restrictions on when the writes can occur as long as they are separated by at least one internal clock period.

In the embodiment of FIG. 16, the synchronizer 1406 includes three flip-flops 1602, 1604, 1606. The first flip-flop 1602 is set asynchronously. Flip-flop 1604 is synchronous and runs off the internal clock (ISOCLK). This is the clock on which the registers are running. The second flip-flop is used to sample the output of the first asynchronous flip-flop 1602. There is a need for a way to reset the first flip-flop 1602. However, because of metastability problems, it is impossible to use the output of the second flip-flop 1604 for resetting the first flip-flop 1602 since it may be metastable. Therefore, the third flip-flop 1606 is provided. This flip-flop is also synchronous with ISOCLK. It is used to sample the output of the second flip-flop 1604. Once the output of the third flip-flop 1606 goes high, it can be used to reset the first asynchronous flip-flop 1602 since it is known not to be metastable.

Since many synchronous designs have to interface to external asynchronous signals, this method of performing write operations will eliminate the bottleneck usually associated with synchronizing signals. An advantage of this design is its ability to overcome certain disadvantages of a two cycle delay in waiting for synchronization to take place. Although technically a two cycle delay is still present for any single write operation, the use of dual register/address banks alleviates the consequences of such delay and a one cycle per write throughput is still obtained.

In connection with hub-node transmissions, at the beginning of a cycle, the hub 44 will begin to transmit a frame to the node, as indicated by the timing marks on time line 216. Because of the line delays in the physical media, the time at which the nodes will receive the frame transmitted by the hub will lag the time when they were sent out from the hub as shown by time line 218. In order to provide for the desired timing described above, a delay 220 is introduced in the timing scheme before the node begins transmission of the next frame up to the hub 222. The delay 220 has a value such that, taking into account the latency introduced by transmission over physical layer/physical layer interface, the hub will begin receiving the transmitted from at times 224 approximately coinciding with the rising edges of the clock signals 214.

Figure 11:
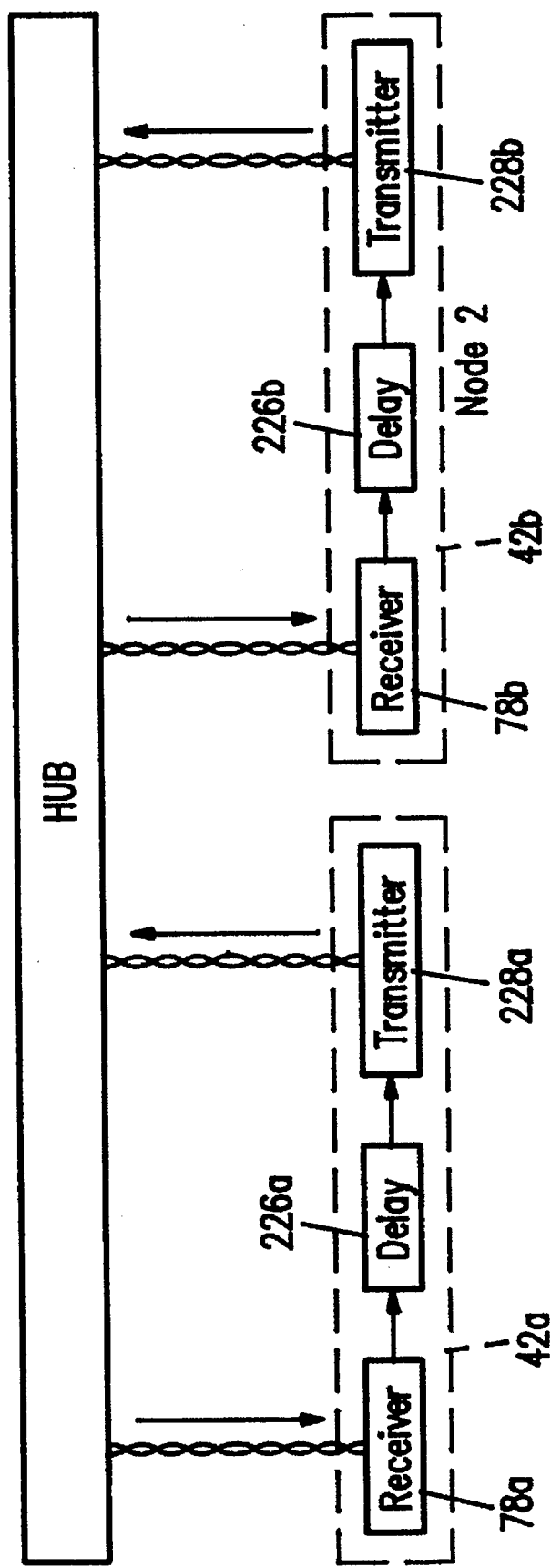
FIG. 11 is a schematic block diagram showing node receivers and transmitters coupled by a delay circuit.

One way of introducing the delay 220 is depicted in FIG. 11. The delay may be introduced by inserting delay circuitry 226a, 226b between the receiving circuitry 78a, 78b of the nodes 42a, 42b and the transmitting circuitry 226a, 226b of the nodes 42a, 42b. Because the latency of physical media will vary from node to node, typically depending on the length of the links, the length of the delay 226a which is appropriate for a given node may be different from the delay 226b which is appropriate for another node. Accordingly, it is possible to detect the latency or delay of a particular link and use this latency to calculate an optimal delay. The calculated optimal delay can then be programmed into the delay circuitry 228a, 228b as appropriate. This is described in more detail in commonly-assigned application Ser. No. 07/970,313 (Attorney File No 8332-318/NS-2027) titled, "ISOCHRONOUS LINK PROTOCOL," filed on Nov. 2, 1992 and incorporated herein by reference. In this way, the cycle reference provided to the node transmitter has the proper phase to assure the timing described above.

The timing scheme described guarantees that the cycle received from the node will arrive slightly sooner than the next cycle will be transmitted from the hub. A small FIFO can be inserted into the hub's received data stream to accurately align the arrival of the cycle. In certain applications, it will also be advantageous to provide a FIFO in the node which would hold the data synchronized with the received cycle reference until it is to be transmitted. Provision of these FIFOs is described in more detail in commonly-assigned application Ser. No. 07/969,917 (Attorney File No. 8332-320/NS-2028), titled "APPARATUS AND METHOD FOR ACCOMMODATING CABLE LENGTH DELAYS USING ISOCHRONOUS FIFOING", filed on Nov. 2, 1992 and incorporated herein by reference.

In light of the above description, a number of advantages of the present invention can be seen. The disclosed configuration allows the processor to send the data needed to update the switch table as soon as it has new updates to perform, regardless of whether the data can actually be written into the switch table at this time. This frees the processor to perform other tasks without having to wait for an appropriate time during the frame.

The present invention provides a channel for isochronous data such that the bandwidth for a particular isochronous source does not necessarily decrease as isochronous traffic on the system increases. The isochronous data transfer is interoperable with the transfer of non-isochronous data in a fashion that is transparent to the media access controllers and to the application software. The described network provides for inter-operating isochronous and non-isochronous data transfer while maintaining the data transfer rate achieved for non-isochronous data in previously in-place systems. The described network can convey both the non-isochronous data and the isochronous data over in-place physical media without degrading the non-isochronous data transfer rate compared to the rate previously carried by the same physical media. Isochronous data is conveyed with a minimized or reduced amount of delay and jitter and with minimized or reduced requirements for buffer memory. Bandwidth to be used for a particular isochronous source is selectable with a specified granularity, such as 64 Kbits/sec granularity, so that isochronous sources and sinks have available to them an amount of bandwidth which is both selectable and sustainable. The disclosed system provides a data exchange mechanism which is compatible with standard media access controller devices. Thus, currently available hardware and associated software may be used over the physical links. Incremental upgrade of equipment can be made as desired. The hub can perform call set-up, channel allocation and isochronous channel management, preferably using source/destination information provided over the D channel.

A number of modifications and variations of the invention can also be used. It is possible to use some aspects without using other aspects. For example, it is possible to provide a dedicated bandwidth for isochronous traffic without using a network which receives non-isochronous data from a Ethernet media access controller. It is possible to transmit non-isochronous-sourced data using a continuously-recurring frame structure without providing a plurality of hubs which are inter-connected. At least some aspects of the described network can be implemented in a non-star-topology, such as by communicating isochronous and non-isochronous data which is time-multiplexed into a recurring frame structure, directly between two nodes. Other types of non-isochronous sources and sinks than those discussed above can also be used, including token bus, ATM, video phones, video servers, computer work stations or other networking schemes. The present invention could be used even though no non-isochronous sources are connected to the system. The present invention can be used even though no isochronous sources or sinks are connected to the system. Other frame structures can be used to provide more or less bandwidth for various types of data such as isochronous data, non-isochronous data, and D channel data. It is possible to operate the described network without using buffers to smooth the "lumpy" data arrival rate, although such an implementation might require replacement of existing MACs. Channels in addition to isochronous, non-isochronous, D channel, and M channels could be provided. Multiplexing both packet-structured non-isochronous data and non-packet-non-isochronous data (such as token ring data) can also be achieved. It is possible for the hub to distribute received isochronous data to the various transmitters using a system other than time slot interchange, such as P1349, ATM or SONET. Data can be encrypted before placing it on the physical media. Although a single port RAM is preferred for the holding registers since this configuration requires less area on a silicon chip, it is also possible to provide the holding register as a dual-port RAM or multi-port RAM. A number of configurations of the present invention are possible. In one configuration, a 24-port hub includes 2 Ethernet repeaters, each supporting 12 Ethernet connections, two isochronous switching devices and 24 physical layer portions.

Although the present invention has been described by way of preferred embodiments and certain variations and modifications, other variations and modifications can also be used, the invention being defined by the following claims.

TABLE IA

BLOCK 0:

| | | | | | | | | | | | | | | | | |
|---|---|---|---|---|---|---|---|---|---|---|---|---|---|---|---|---|
| J | K | E | B | E | B | E | B | E | B | E | B | E | B | E | E | Group0 |
| E | E | E | B | E | B | E | B | E | B | E | B | E | B | E | E | Group1 |
| E | E | E | B | E | B | E | B | E | B | E | B | E | B | E | B | Group2 |
| E | E | E | B | E | B | E | B | E | B | E | B | E | B | E | B | Group3 |
| E | E | E | B | E | B | E | B | E | B | E | B | E | B | E | E | Group4 |
| E | E | E | B | E | B | E | B | E | B | E | B | E | B | E | E | Group5 |
| E | E | E | B | E | B | E | B | E | B | E | B | E | B | E | E | Group6 |
| E | E | E | B | E | B | E | B | E | B | E | B | E | B | E | E | Group7 |

BLOCK 1:

| | | | | | | | | | | | | | | | | |
|---|---|---|---|---|---|---|---|---|---|---|---|---|---|---|---|---|
| M | M | E | B | E | B | E | B | E | B | E | B | E | B | E | E | Group8 |
| E | E | E | B | E | B | E | B | E | B | E | B | E | B | E | E | Group9 |
| E | E | E | B | E | B | E | B | E | B | E | B | E | B | E | E | Group10 |
| E | E | E | B | E | B | E | B | E | B | E | B | E | B | E | E | Group11 |
| E | E | E | B | E | B | E | B | E | B | E | B | E | B | E | E | Group12 |
| E | E | E | B | E | B | E | B | E | B | E | B | E | B | E | E | Group13 |
| E | E | E | B | E | B | E | B | E | B | E | B | E | B | E | E | Group14 |
| E | E | E | B | E | B | E | B | E | B | E | B | E | B | E | E | Group15 |

BLOCK 2:

| | | | | | | | | | | | | | | | | |
|---|---|---|---|---|---|---|---|---|---|---|---|---|---|---|---|---|
| D | D | E | B | E | B | E | B | E | B | E | B | E | B | E | E | Group16 |
| E | E | E | B | E | B | E | B | E | B | E | B | E | B | E | E | Group17 |
| E | E | E | B | E | B | E | B | E | B | E | B | E | B | E | E | Group18 |
| E | E | E | B | E | B | E | B | E | B | E | B | E | B | E | E | Group19 |
| E | E | E | B | E | B | E | B | E | B | E | B | E | B | E | E | Group20 |
| E | E | E | B | E | B | E | B | E | B | E | B | E | B | E | E | Group21 |
| E | E | E | B | E | B | E | B | E | B | E | B | E | B | E | E | Group22 |
| E | E | E | B | E | B | E | B | E | B | E | B | E | B | E | E | Group23 |

BLOCK 3:

| | | | | | | | | | | | | | | | | |
|---|---|---|---|---|---|---|---|---|---|---|---|---|---|---|---|---|
| E | M | E | B | E | B | E | B | E | B | E | B | E | B | E | E | Group24 |
| E | E | E | B | E | B | E | B | E | B | E | B | E | B | E | E | Group25 |
| E | E | E | B | E | B | E | B | E | B | E | B | E | B | E | E | Group26 |
| E | E | E | B | E | B | E | B | E | B | E | B | E | B | E | E | Group27 |
| E | E | E | B | E | B | E | B | E | B | E | B | E | B | E | E | Group28 |
| E | E | E | B | E | B | E | B | E | B | E | B | E | B | E | E | Group29 |
| E | E | E | B | E | B | E | B | E | B | E | B | E | B | E | E | Group30 |
| E | E | E | B | E | B | E | B | E | B | E | B | E | B | E | E | Group31 |

JK = Frame Synchronization Pattern
MM = 8 Maintenance Bits
D = D Channel
EM = Ethernet Pad & 4 Maintenance Bits
E = Ethernet Packet Channel
B = Isochronous Channel

TABLE IB

BLOCK 0:

| | | | | | | | | | | | | | | | | |
|---|---|---|---|---|---|---|---|---|---|---|---|---|---|---|---|---|
| J | K | B | B | B | B | B | B | B | B | B | B | B | B | B | B | Group0 |
| B | B | B | B | B | B | B | B | B | B | B | B | B | B | B | B | Group1 |
| B | B | B | B | B | B | B | B | B | B | B | B | B | B | B | B | Group2 |
| B | B | B | B | B | B | B | B | B | B | B | B | B | B | B | B | Group3 |
| B | B | B | B | B | B | B | B | B | B | B | B | B | B | B | B | Group4 |
| B | B | B | B | B | B | B | B | B | B | B | B | B | B | B | B | Group5 |
| B | B | B | B | B | B | B | B | B | B | B | B | B | B | B | B | Group6 |
| B | B | B | B | B | B | B | B | B | B | B | B | B | B | I | I | Group7 |

BLOCK 1:

| | | | | | | | | | | | | | | | | |
|---|---|---|---|---|---|---|---|---|---|---|---|---|---|---|---|---|
| M | M | B | B | B | B | B | B | B | B | B | B | B | B | B | B | Group8 |
| B | B | B | B | B | B | B | B | B | B | B | B | B | B | B | B | Group9 |
| B | B | B | B | B | B | B | B | B | B | B | B | B | B | B | B | Group10 |
| B | B | B | B | B | B | B | B | B | B | B | B | B | B | B | B | Group11 |
| B | B | B | B | B | B | B | B | B | B | B | B | B | B | B | B | Group12 |
| B | B | B | B | B | B | B | B | B | B | B | B | B | B | B | B | Group13 |
| B | B | B | B | B | B | B | B | B | B | B | B | B | B | B | B | Group14 |
| B | B | B | B | B | B | B | B | B | B | B | B | B | B | I | I | Group15 |

TABLE IB-continued

BLOCK 2:

| | | | | | | | | | | | | | | | | |
|---|---|---|---|---|---|---|---|---|---|---|---|---|---|---|---|---|
| D | D | B | B | B | B | B | B | B | B | B | B | B | B | B | B | Group16 |
| B | B | B | B | B | B | B | B | B | B | B | B | B | B | B | B | Group17 |
| B | B | B | B | B | B | B | B | B | B | B | B | B | B | B | B | Group18 |
| B | B | B | B | B | B | B | B | B | B | B | B | B | B | B | B | Group19 |
| B | B | B | B | B | B | B | B | B | B | B | B | B | B | B | B | Group20 |
| B | B | B | B | B | B | B | B | B | B | B | B | B | B | B | B | Group21 |
| B | B | B | B | B | B | B | B | B | B | B | B | B | B | B | B | Group22 |
| B | B | B | B | B | B | B | B | B | B | B | B | B | B | I | I | Group23 |

BLOCK 3:

| | | | | | | | | | | | | | | | | |
|---|---|---|---|---|---|---|---|---|---|---|---|---|---|---|---|---|
| I | M | B | B | B | B | B | B | B | B | B | B | B | B | B | B | Group24 |
| B | B | B | B | B | B | B | B | B | B | B | B | B | B | B | B | Group25 |
| B | B | B | B | B | B | B | B | B | B | B | B | B | B | B | B | Group26 |
| B | B | B | B | B | B | B | B | B | B | B | B | B | B | B | B | Group27 |
| B | B | B | B | B | B | B | B | B | B | B | B | B | B | B | B | Group28 |
| B | B | B | B | B | B | B | B | B | B | B | B | B | B | B | B | Group29 |
| B | B | B | B | B | B | B | B | B | B | B | B | B | B | B | B | Group30 |
| B | B | B | B | B | B | B | B | B | B | B | B | B | B | I | I | Group31 |

JK = Frame Synchronization Pattern
M = Maintenance Channel
D = D Channel
I = Idle Data
B = Isochronous Channel

TABLE II

| Symbol | Encoded (5 bit) | Description |
|---|---|---|
| 0 | 11110 | Data 0 |
| 1 | 01001 | Data 1 |
| 2 | 10100 | Data 2 |
| 3 | 10101 | Data 3 |
| 4 | 01010 | Data 4 |
| 5 | 01011 | Data 5 |
| 6 | 01110 | Data 6 |
| 7 | 01111 | Data 7 |
| 8 | 10010 | Data 8 |
| 9 | 10011 | Data 9 |
| A | 10110 | Data A |
| B | 10111 | Data B |
| C | 11010 | Data C |
| D | 11011 | Data D |
| E | 11100 | Data E |
| F | 11101 | Data F |
| I | 11111 | No Ethernet Carrier |
| S | 11001 | No Ethernet Data |
| V | 01100 | Unaligned Data |
| T | 01101 | Unassigned |
| J | 11000 | Frame Sync Part 1 |
| K | 10001 | Frame Sync Part 2 |
| Q | 00000 | Invalid |
| H | 00100 | Invalid |
| R | 00111 | Invalid |
| V | 00001 | Invalid |
| V | 00010 | Invalid |
| V | 00011 | Invalid |
| V | 00101 | Invalid |
| V | 00110 | Invalid |
| V | 01000 | Invalid |
| V | 10000 | Invalid |

TABLE III

| Channel | Bytes/Frame | Bits/Frame | Kbits/sec | Usage |
|---|---|---|---|---|
| JK | 1.0 | 8 | 64 | Frame Synchronization |
| B | 96.0 | 768 | 6,144 | Isochronous |
| E | 156.5 | 1,252 | 10,016 | Ethernet Packet |
| D | 1.0 | 8 | 64 | D channel |
| M | 1.5 | 12 | 96 | Maintenance |
| Total | 256.0 | 2,048 | 16,384 Mbits/sec | |

TABLE IV

| | |
|---|---|
| ST(10:0) | The switch table address. ST10 is the most significant bit (MSB). Represents the IMC or TSI time slot number (1 through 1536). |
| BUF(10:0) | The buffer address containing the data to be switched. BIF10 is the MSB. |
| ETE/IA | External Transmit Enable: When set, indicates the slot is switched onto the TSI Ring. Idle Address: When set indicates the idle pattern to be switched to an isoEnet node. This provides a data pattern which could decrease noise in the system. |
| ITE | Internal Transmit Enable: When set, indicates the slot is loopbacked internally and destined for a locally attached node, as described in U.S. Pat. application S/N 07/969,910, "LOCAL LOOP-BACK OF ISOCHRONOUS DATA IN A SWITCHING MECHANISM" (Attorney File No. 8332-317/NS-2025). |
| IPE | Idle Pattern Enable: When set, indicates that an idle pattern is to be transmitted. This transmission of an idle pattern provides a known data pattern. |
| TSE | Tri-State Enable: When set, the controller drives the TSI ring tri-state output drivers. This control is used to eliminate contention on a shared TSI bus in certain system configurations. |
| LD | Last Data: When set, indicates to the controller the arrival of the last update data to the RX or TX Switch Table Holding Register during a switch table update. |
| C/$\overline{D}$ | Control/DATA: This bit indicates the contents of the 16 bits of data. "0" indicates switch table data. "1" indicates the switch table location for loading data as well as indicates the last word in the switch table update. |
| RES: | Reserved. |

What is claimed is:

1. In a computer-controlled system having a microprocessor operating according to a clock and an updatable table operating asynchronously of said clock, said updatable table outputting control data for controlling data transfer in said system, apparatus for updating said updatable table, comprising:

register means for receiving update data from said microprocessor during a first time period at a data rate corresponding to said clock and outputting said update data to said updatable table;

means, coupled to said register means, for determining the beginning of a second period of time during which said updatable table is not being used and for updating said updatable table during said second period, asynchronously with said clock, using at least some of said update data.

2. Apparatus, as claimed in claim 1, further comprising a plurality of shadow registers wherein data stored in said register means at a first storage time is also stored in at least one of said plurality of shadow registers substantially simultaneously with said first storage time.

3. Apparatus, as claimed in claim 1, wherein said updatable table comprises an updatable transmit table and updatable receive table, and wherein said register means includes at least a transmit holding register for holding data for updating said updatable transmit table and a receive holding register, different from said transmit holding register, for holding data for updating said updatable receive table.

4. In a computer-controlled system having a microprocessor operating according to a clock and an updatable table operating asynchronously with said clock, said updatable table outputting control data for controlling data transfer in said system, a method for updating said updatable table, comprising:

receiving update data in a first register from said microprocessor during a first time period at a data rate corresponding to said clock and outputting said update data to said updatable table;

determining the beginning of a second period of time during which said updatable table is not being used and updating said updatable table during said second period of time during which said updatable table is not being used, asynchronously with said clock, using at least some of said update data.

5. A method, as claimed in claim 4, wherein said update data includes at least one control word, indicating a table update location, and at least one data word, including data to be stored at said update location.

6. A method, as claimed in claim 5, wherein said update data includes more data words than control words.

7. A method, as claimed in claim 6, further comprising incrementing said control word by a first amount to provide a new table update location for a subsequent table update.

8. A method, as claimed in claim 7, wherein said first amount is programmable.

9. A method, as claimed in claim 4 wherein said update data includes a plurality of words each of said plurality of words having at least one bit indicating whether the word is a control word or a data word.

10. A method, as claimed in claim 4, wherein said update data includes a plurality of words each of said plurality of words having at least one bit indicating whether the word is the last data word of the update data.

11. A method, as claimed in claim 4, further comprising notifying said microprocessor when the table update is complete.

12. A method, as claimed in claim 11, wherein said step of notifying comprises sending an interrupt to said processor.

13. A method, as claimed in claim 11, wherein, after said microprocessor has written said update data into said first register, said microprocessor is prevented from writing further data into said first register until after said step of notifying.

14. Apparatus for communicating between at least first and second stations in a data communication system over at least a first link, said data communication system including a plurality of data sources and sinks, at least a first of said sources and sinks configured to receive or transmit data isochronously and a second of said sources and sinks configured to transmit data non-isochronously, the apparatus comprising:

at least a first receiver and at least a first transmitter in said first station;

said first link coupling said first station with said second station;

said second station being coupled to both said first and second of said sources and sinks;

a second transmitter in said second station for transmitting data to said first receiver;

a first multiplexer in said second station for permitting the transmitting of data from both of said first and second sources and sinks over said first link as first multiplexed data, said multiplexer providing a first, dedicated bandwidth for first data originating from an isochronous source, including at least said first of said sources and sinks;

at least a first updatable switchtable in said first station for storing information indicating at least the destination of data;

a microprocessor operating according to a first clock, coupled to said updatable switchtable, said updatable switchtable operating according to a second clock asynchronously with said first clock;

a register coupled to said microprocessor for receiving update data from said microprocessor during a first time period at a data rate corresponding to said first clock and coupled to said first updatable switchtable for outputting said update data to said first updatable switchtable.

15. A method for communicating data over a data link in a data communication system between a first station coupled to a first endpoint of said data link and a second station coupled to a second endpoint of said data link, said second station having both an isochronous data source and a non-isochronous data source, said data communication system having a time-varying amount of non-isochronous demand, the method comprising;

time-division multiplexing data from said isochronous data source and said non-isochronous data source according to a periodically repeating frame structure, said frame structure defining at least a first dedicated bandwidth for data from said isochronous source, wherein the data transfer rate for said isochronous data is substantially independent of the non-isochronous demand on said data system;

providing a microprocessor in said first station operating according to a first clock and an updatable table operating according to a second clock asynchronously with said first clock;

receiving update data in a holding register from said microprocessor during a first time period at a data rate corresponding to said first clock, said update data including at least destination data;

updating said updatable table asynchronously with said first clock, using at least some of said update data in said holding register; and transmitting the time-multiplexed data onto said data link in accordance with data stored in said updatable table.

16. A method, as claimed in claim 15, wherein said step of updating comprises:

sampling said second clock;

providing said sampled second clock to a one-shot circuit whose output indicates the rising edge of said second clock.

17. A method, as claimed in claim 15, further comprising:

waiting up to a predetermined maximum wait time before performing said step of receiving update data if fewer than a predetermined number of update words are contained in said update data.

18. A method, as claimed in claim 17, wherein said predetermined number of update words is equal to the number of word that can be stored in said holding register.

* * * * *